United States Patent [19]

Tuckerman, III

[11] 4,078,152
[45] Mar. 7, 1978

[54] BLOCK-CIPHER CRYPTOGRAPHIC SYSTEM WITH CHAINING

[75] Inventor: Louis Bryant Tuckerman, III, Briarcliff Manor, N.Y.

[73] Assignee: International Business Machines Corporation, Armonk, N.Y.

[21] Appl. No.: 680,405

[22] Filed: Apr. 26, 1976

[51] Int. Cl.² .......................... H04K 1/06; H04L 9/02
[52] U.S. Cl. ...................................................... 178/22
[58] Field of Search .............................. 178/22; 35/4

[56] References Cited

U.S. PATENT DOCUMENTS

| | | | |
|---|---|---|---|
| 3,657,699 | 4/1972 | Rochen et al. | 178/22 |
| 3,740,475 | 6/1973 | Ehrat | 178/22 |
| 3,798,359 | 4/1974 | Feistel | 178/22 |
| 3,798,360 | 4/1974 | Feistel | 178/22 |
| 3,911,216 | 10/1975 | Bartek et al. | 178/22 |

*Primary Examiner*—Samuel W. Engle
*Assistant Examiner*—S. A. Cangialosi
*Attorney, Agent, or Firm*—Roy R. Schlemmer, Jr.

[57] ABSTRACT

A Block-Cipher Cryptographic System utilizing a unique user supplied key to control the cryptographic function and including means for modifying an input data block prior to performing a key-controlled transformation operation thereon. Said means includes means for extracting a segment of data utilized in a prior cryptographic transformation of the system and combining said segment with the input data block. The means for combining comprises a transformation which is a discrete valued function which in the preferred embodiment is an exclusive-or. In the preferred embodiment of the invention a block of ciphertext data is combined with the just succeeding input data block by an exclusive-or operation prior to the key-controlled transformation operation which produces said ciphertext blocks.

A means for detecting and cryptographically transforming short blocks of data is also disclosed wherein an input short data block is combined in a mathematically invertible operation with a block of data which is passed through said key-controlled block cipher cryptographic subsystem prior to said combination. The so transformed short block is then output as a short block in cryptographically modified form.

16 Claims, 16 Drawing Figures

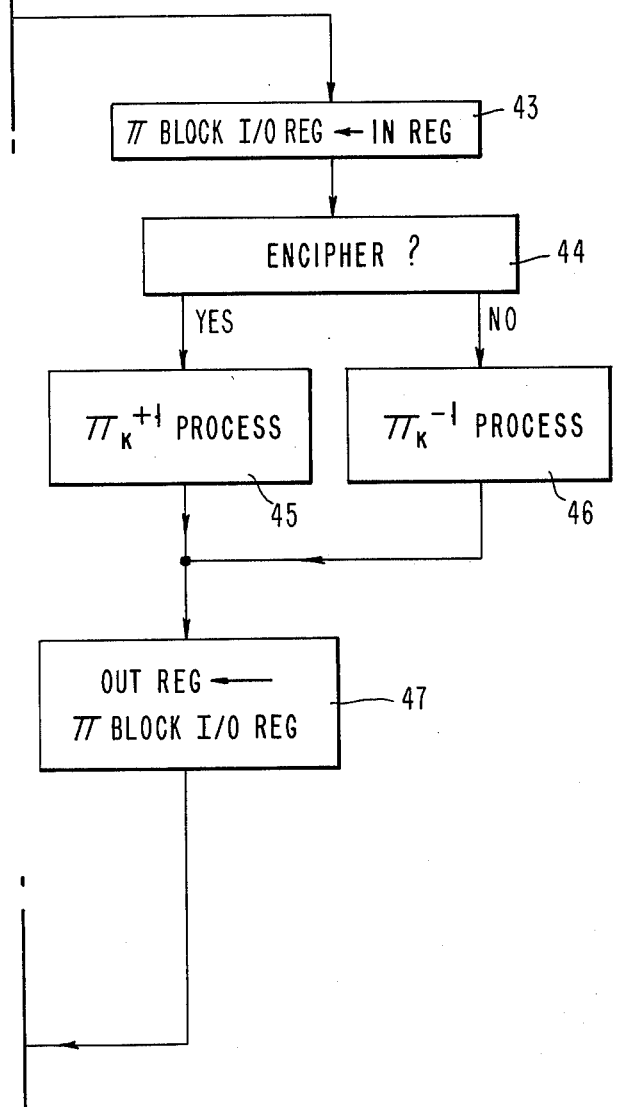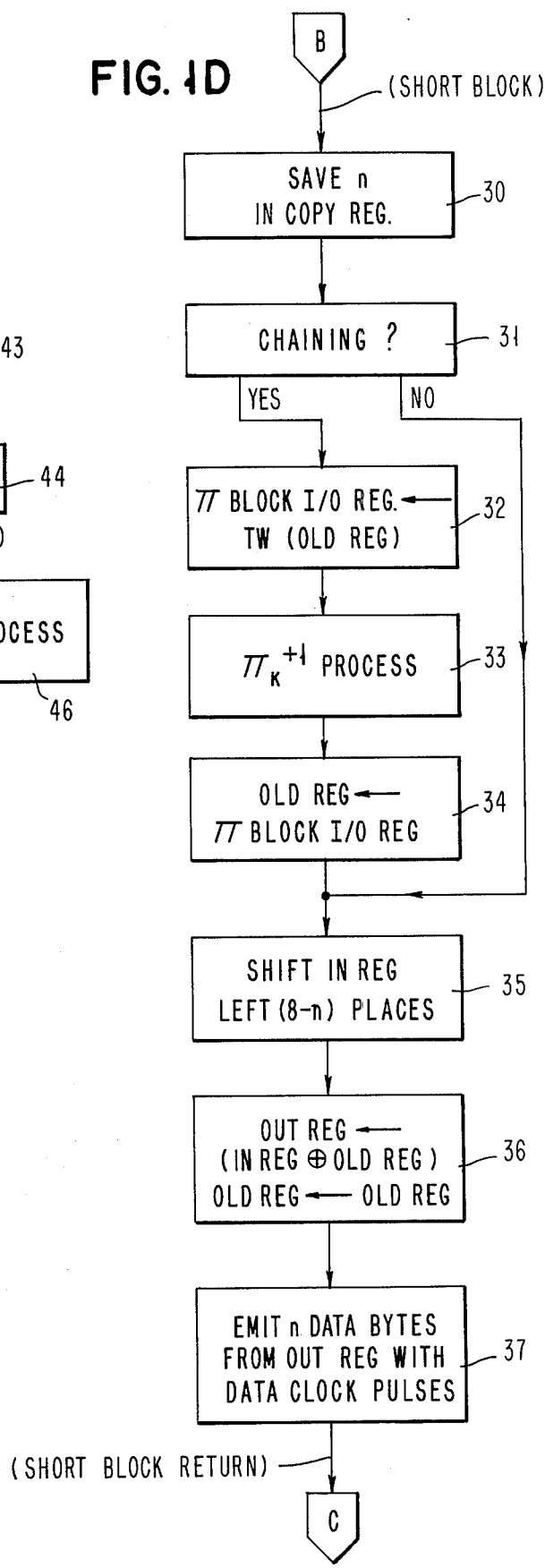

FIG. 4A

```
CQXP      TITLE  'EXTENDED PRECISION COMPLEX EXPONENTIAL ROUTINE'         CQX00010
          PRINT  ON,DATA,NOGEN                                            CQX00020
IHOCQEXP  CSECT                                                           CQX00030
          SPACE                                                           CQX00040
*         COMPLEX EXPONENTIAL FUNCTION (EXTENDED PRECISION)               CQX00050
*                                                                         CQX00060
*                1. EXP(X+IY) = EXP(X)*(COS(Y)+I*SIN(Y))                  CQX00070
*                                                                         CQX00080
          SPACE                                                           CQX00090
          ENTRY  CQEXP                                                    CQX00100
          ENTRY  IH$CQEXP                                                 CQX00110
          EXTRN  QEXP                                                     CQX00120
          EXTRN  QSIN                                                     CQX00130
          EXTRN  QCOS                                                     CQX00140
          SPACE                                                           CQX00150
GRA       EQU    1              ARGUMENT POINTER                          CQX00160
GRB       EQU    4              BASE REGISTER                             CQX00170
GRS       EQU    13             SAVE AREA POINTER                         CQX00180
GRR       EQU    14             RETURN REGISTER                           CQX00190
GRL       EQU    15             LINK REGISTER                             CQX00200
GR0       EQU    0              SCRATCH REGISTERS                         CQX00210
GR1       EQU    1                                                        CQX00220
GR2       EQU    2                                                        CQX00230
GR3       EQU    3                                                        CQX00240
FR0       EQU    0              FLOATING POINT REGISTERS                  CQX00250
FR2       EQU    2              REAL PART ANSWER GIVEN IN FR0-FR2         CQX00260
FR4       EQU    4              IMAG PART ANSWER GIVEN IN FR4-FR6         CQX00270
FR6       EQU    6                                                        CQX00280
ISNEXP    EQU    X'508'         IDENTIFIER NUMBER FOR QEXP CALL           CQX00290
ISNSIN    EQU    X'50A'         IDENTIFIER NUMBER FOR QSIN CALL           CQX00300
ISNCOS    EQU    X'50C'         IDENTIFIER NUMBER FOR QCOS CALL           CQX00310
          SPACE                                                           CQX00320
          USING  *,GRL                                                    CQX00330
IH$CQEXP  EQU    *                                                        CQX00340
CQEXP     B      BEGIN                                                    CQX00350
          DC     AL1(5)                                                   CQX00360
          DC     CL5'CQEXP'                                               CQX00370
```

FIG. 4B   ENCIPHERMENT WITH NO CHAINING :

DECIPHERMENT OF ALTERATION OF ENCIPHERMENT WITH RECORD-CHAINING:

```
?T*S   6*   TITLE 'EXTENDED PRECISION COMPLEX EXPONENTIAL ROUTINE'         CQX00010
?           PRINR ON,DATA,NOGEN                                            CQX00020
dA8         CSECT                                                          CQX00030
*t *   3    SPACE                                                          CQX00040
T*-    tMPLEX EXPONENTIAL FUNCTION (EXTENDED PRECISION)                    CQX00050
6@#N   H                                                                   CQX00060
L7sc u      1. EXP(X+IY) = EXP(X)*(COS(Y)+I*SIN(Y))                        CQX00070
4,   ±                                                                     CQX00080
    uf f5 j                                                                CQX00090
#     7I    QEXP +                                                         CQX00100
     x /    H$CQEX                                                         CQX00110
    F$ 2e&B rEXP    k                                                      CQX00120
       T  • i  IN                                                          CQX00130
       5>Ra  YC  S                                                         CQX00140
       ! m  x-+                                                            CQX00150
GRA    EQU   0                    ARGUMENT POINTER                         CQX00160
GRB    EQU   4   1: 78            * BASE REGISTER                          CQX00170
GRS    EQU   7   Wp1X             SAVE AREA POINTER                        CQX00180
GRR    EQU   1o Ies  ±            ETURN REGISTER                           CQX00190
GBL    EQU   1 C'x* +             L NK REGISTER                            CQX00200
GR0    EQU   0    ={              SCRATCH REGISTERS                        CQX00210
GR1    EQU   1      r5    •   u                                            CQX00220
GR2    EQU   2  Q   Q*    o                                                CQX00230
GR3    EQU   3Kew=8 fo     >                                               CQX00240
FR0    EQU   0                    EF OATI G POINT REGISTERS                CQX00250
FR2    EQU   2                    (¢Z°REAL ART ANSWER GIVEN IN FR0-FR2     CQX00260
FR4    EQU   4                    ( :  IMAG P RT ANSWER GIVEN IN FR4-FR6   CQX00270
FR6    EQU   6                    *! P: $                                  CQX00280
ISNEXP EQU   X'508'               ! L NTIFIER NUMBER FOR QEXP CALL         CQX00290
ISNSIN EQU   X'50A'              • 6 (*E TIFIER NUMBER FOR QSIN CALL       CQX00300
ISNCOS EQU   X'50C'               ?  rENSIFIER NUMBER FOR QCOS CALL        CQX00310
       SPACE                                                               CQX00320
       USING *,GRL      r   Hk         *                                   CQX00330
IH$CQEXP EQU *                                                             CQX00340
CQEXP  B     BEGIN              W  0                                       CQX00350
       DC    AL1(5)             I  c=*L     (                              CQX00360
       DC    CL5'CQEXP'          Kw e       E                              CQX00370
                              +    ¢  aw
``` ically improbable. However, with the advent of computing systems which have a very large and fast processing capability, there has been a concern that a product cipher algorithm may be broken by the use of such systems.

BLOCK-CIPHER CRYPTOGRAPHIC SYSTEM WITH CHAINING

CROSS REFERENCE TO RELATED PATENTS AND APPLICATIONS

Reference is hereby made to U.S. Pat. No. 3,798,359, entitled Block Cipher Cryptographic System; U.S. Pat. No. 3,796,830, entitled Recirculating Block Cipher Cryptographic System; and U.S. Pat. application Ser. No. 552,685 of W. F. Ehrsam, filed Feb. 1975, now U.S. Pat. No. 3,958,081, entitled Block Cipher System for Data Security, all assigned to the same assignee as the present application.

BACKGROUND OF THE INVENTION

There is an increasing need in modern industry for data privacy and/or security. In the communications field, data being transmitted via radio communication or telephone lines is susceptible of interception and unauthorized use or alteration. In the computer industry the unauthorized access to data may be obtained for example by accessing various storage devices or intercepting messages being transmitted between terminals or between the terminals and the host of remote-access computer networks. In such networks a large number of subscribers are provided access to "data banks" for receiving, storing, processing and furnishing information of a confidential nature. The need for data security in such systems cannot be too highly emphasized.

Generally, present-day computing centers have elaborate procedures for maintaning physical security at the location where the central processor and data-storage facilities are located. For example, some of the procedures which have been used are: restriction of personnel within the computer center, utilization of mechanical keys for activation of equipment, and camera surveillance. These security procedures, while providing a measure of safety in keeping unauthorized individuals from the physical computing center itself, are not effective with respect to large remote-access computer networks which have many terminals located at distant sites, connected to the central processor by either cable or telecommunication lines.

Some digital techniques have been implemented in computing systems for the purpose of maintaining privacy of data. One such approach is the use of a device generally known as "memory protection". This type of data security technique associates a unique binary key with selected segments of the storage within the central processor. Then, internal to the processor, there are present various protection circuits that check for a match of the binary key during the operation of executable instructions and accesses to sections of storage. This type of security measure is generally ineffective in protecting information within the computing system from unauthorized individuals who have knowledge of the computing system circuitry, and who can devise sophisticated programming techniques for illegally obtaining unauthorized access to data.

In the field of communications, cryptography has long been recognized as a means for achieving security and privacy. Many systems have been developed in the prior art for encrypting messages for maintaining secrecy of communications. For example, one well-known technique which has been used for generating "ciphertext" from "plaintext" messages is of substitution. In systems which utilize substitution, letters or symbols that comprise the clear message are replaced by some other symbols in accordance with a predetermined "key". The resulting substituted message is a cipher which is expected to be secret and hopefully can not be understood without the knowledge of the secret key. A particular advantage of substitution in accordance with a prescribed key is that the deciphering operation is easily implemented by reverse application of the key. A common implementation of substitution techniques may be found in ciphering-wheel devices, for example, those disclosed in U.S. Pat. Nos. 2,964,856 and 2,984,700, filed Mar. 10, 1941 and Sept. 22, 1944 respectively.

Further teachings on the design principles of more advanced substitution techniques may be found in "Communication Theory of Secrecy Devices" by C. E. Shannon, Bell System Technical Journal, Vol. 28, Pages 656–715, October 1949. Shannon, in his paper, presents further developments in the art of cryptography for expounding the product cipher, that is, the successive application of two or more distinctly different kinds of message-symbol transformation. One example of a product cipher consists of a symbol substitution followed by a symbol transposition.

Another well-known technique for enciphering a clear message communication is the use of a stream-generator sequence which is utilized to form a modulo sum with the symbol that comprise the clear message. The cipher output message stream formed by the modulo sum would then be unintelligible to the receiver of the message, if it does not have knowledge of the stream-generator sequence. Examples of such stream-generators may be found in U.S. Pat. Nos. 3,250,855 and 3,364,308, filed May 23, 1962 and Jan. 23, 1963, respectively.

Various ciphering systems have been developed in the prior art for rearranging communication data in some ordered way to provide secrecy. For example, U.S. Pat. No. 3,522,374 filed June 12, 1967 teaches the processing of a clear message with a key-material generator that controls the number of cycles for enciphering and deciphering. Related to this patent is U.S. Pat. No. 3,506,783 filed June 12, 1967 which discloses the means for generating the key-material which gives a very long pseudo-random sequence. Another approach which has been utilized in the prior art for establishing secret communications is the coding of the electrical signal representations comprising a message that are transmitted over the communications channel. This type of technique is usually more useful in preventing jamming rather than in preventing a cryptanalyst from understanding a cipher message. Exemplary systems of this type may be found in U.S. Pat. Nos. 3,411,089, filed June 28, 1962 and 3,188,390, filed June 8, 1965.

In the area of computer data communications, it has generally been found that product ciphers are superior to other types of ciphering schemes, as discussed in "Cryptography and Computer Privacy" by H. Feistel, Scientific American, Volume 228, No. 5, May 1973, pp. 15–23. Examples of product ciphering systems are disclosed in the two previously referenced U.S. Pat. Nos. 3,798,359 and 3,796,830, as well as the copending application Ser. No. 552,685. These patent references disclose systems for generating a product cipher under the control of the unique user key. With careful selection of the size of the data block and the key size, the probability of ever cracking the cipher becomes extremely small. That is, a cipher becomes impractical to crack by trial of all possible combinations of the key. This is particularly true if the ciphertext reveals no information with regard to the unique user key.

The previously referenced block cipher cryptographic systems, especially those utilizing the non-affine transformation of substitution, may be utilized to produce extremely secure ciphers. However, the price which one must pay to produce such a cipher with these systems is the iteration or repetition of the encipherment process a plurality of times. For example, 16 such rounds is often considered the minimum number to produce a cipher of satisfactory security utilizing such systems.

In an effort to effect a standard for government use which will aid government agencies in carrying out new privacy legislation, the National Bureau of Standards has recently proposed a Federal Information Processing Standards entitled, "Encryption Algorithm for Computer Data Protection". The proposed standard together with a complete technical description is contained in the Federal Register, Volume 40, No. 52, Monday, Mar. 17, 1975, on pages 12134 through 12139. The key-controlled block-ciper cryptographic system described in the NBS standard proposal is an algorithmic description of the specific hardware disclosed in the previously referenced co-pending U.S. application Ser. No. 552,685.

A problem with such block-cipher cryptographic systems is that any given block of data $x$ will be transferred into an output block $y$, and further, assuming that the same key is used in all instances, identical $x$'s will always produce identical $y$'s in the output. As will be discussed more fully subsequently with respect to FIGS. 4A through 4E, this can be a problem where there are large strings of identical blocks occurring in a given record to be encrypted. Such, for example, is source code for a computer, wherein many blanks exist.

Further, the above-referenced block-cipher systems assume in each instance that a full data block is received, and any short blocks must be artifically padded prior to the encryption and sent out in the full block form. This is disadvantageous in a number of respects, since it requires the storage of unnecessary or non-information-bearing data in storage or correspondingly requires the transmitting of such non-information-bearing data.

SUMMARY AND OBJECTS OF THE INVENTION

It has now been found that the repetitive nature of the output of such key-controlled block-cipher cryptographic systems may be removed by chaining each new data block to be transformed in the cryptographic system with a segment of data representative of some element or elements of past history of the data flow in the system, wherein such new input data block is combined with said past history data in a mathematically invertible transformation prior to the encryption operation. It has further been found that by combining each new input data block with a prior ciphertext block, very limited error propagation will occur.

Additionally, short blocks may be processed by combining said short block with a key-controlled transformation of a data block obtained externally of said short block.

It is accordingly a primary object of the present invention to provide a key-controlled block-cipher cryptographic system wherein identical input data blocks will produce different cryptographically transformed output data blocks.

It is a further object of the present invention to provide such a system which produces such variation by chaining.

It is yet another object of the invention to provide such a cryptographic system wherein each new input data block to be cryptographically transformed is combined by a block of data which existed during a previous transformation operation.

It is still a further object of the invention to provide such a cryptographic system wherein each new data block is combined in a mathematically invertible transformation with the just prior cryptographically transformed data block.

It is yet another object of the invention to provide such a cryptographic system for cryptographically transforming short input data blocks as a key-controlled function of said cryptographic transformation and of a block of data which existed during a previous transformation operation, and outputting only the short encrypted data block.

These and other objects, features and advantages of the invention will be apparent from the subsequent description of the presently disclosed preferred embodiment of the invention, as set forth in the following specifications and claims.

DESCRIPTION OF THE DRAWINGS

FIGS. 1A through 1D comprise a high level flow-chart specifying the operating sequences of the present cryptographic system.

FIG. 3 is an organizational diagram for FIGS. 3A through 3C.

FIGS. 4A through 4E comprise computer printouts of a typical data file under different conditions of application of the present invention thereto.

DESCRIPTION OF THE DISCLOSED EMBODIMENTS

Figure 1A:
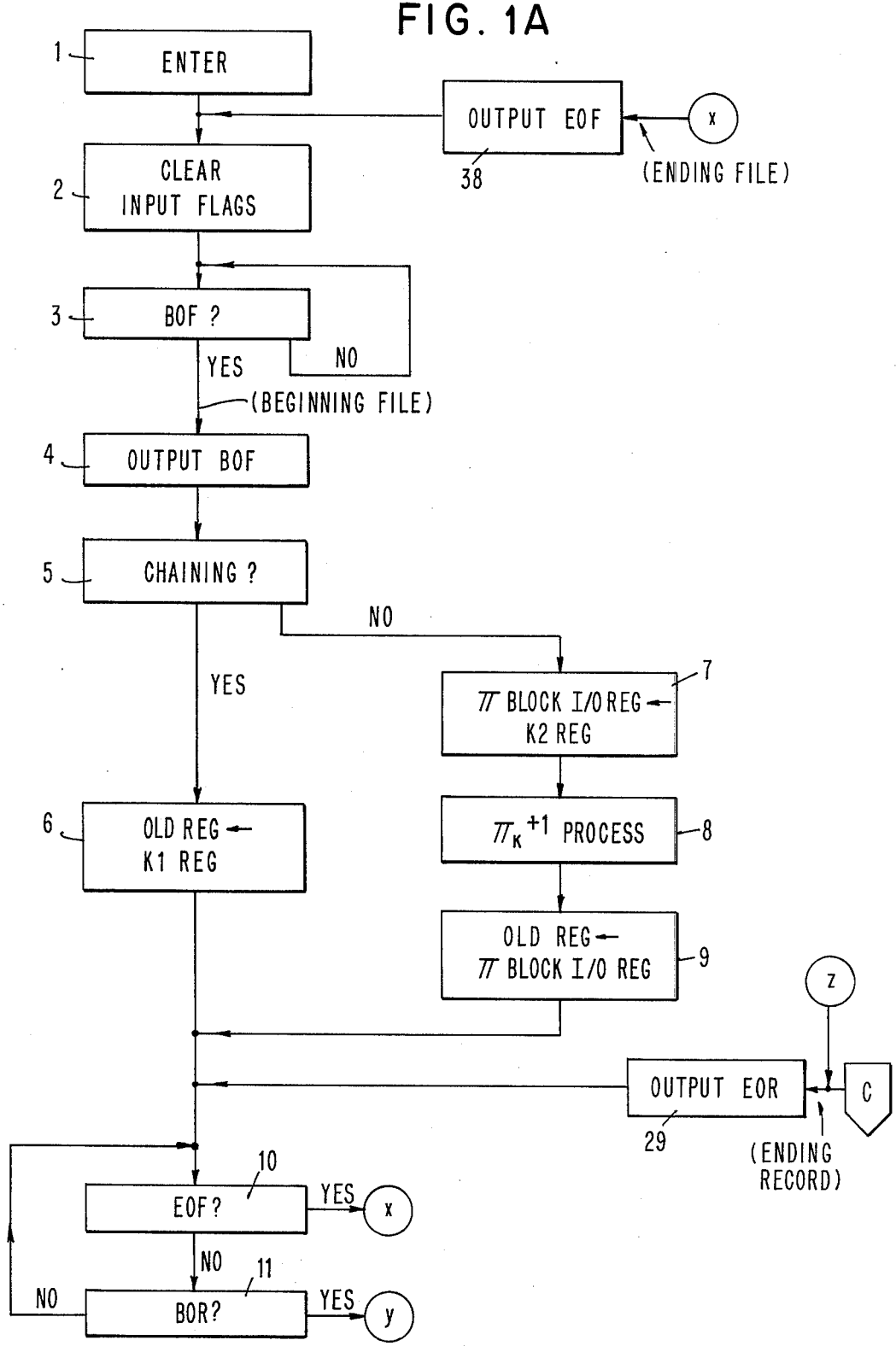
Figure 1B:
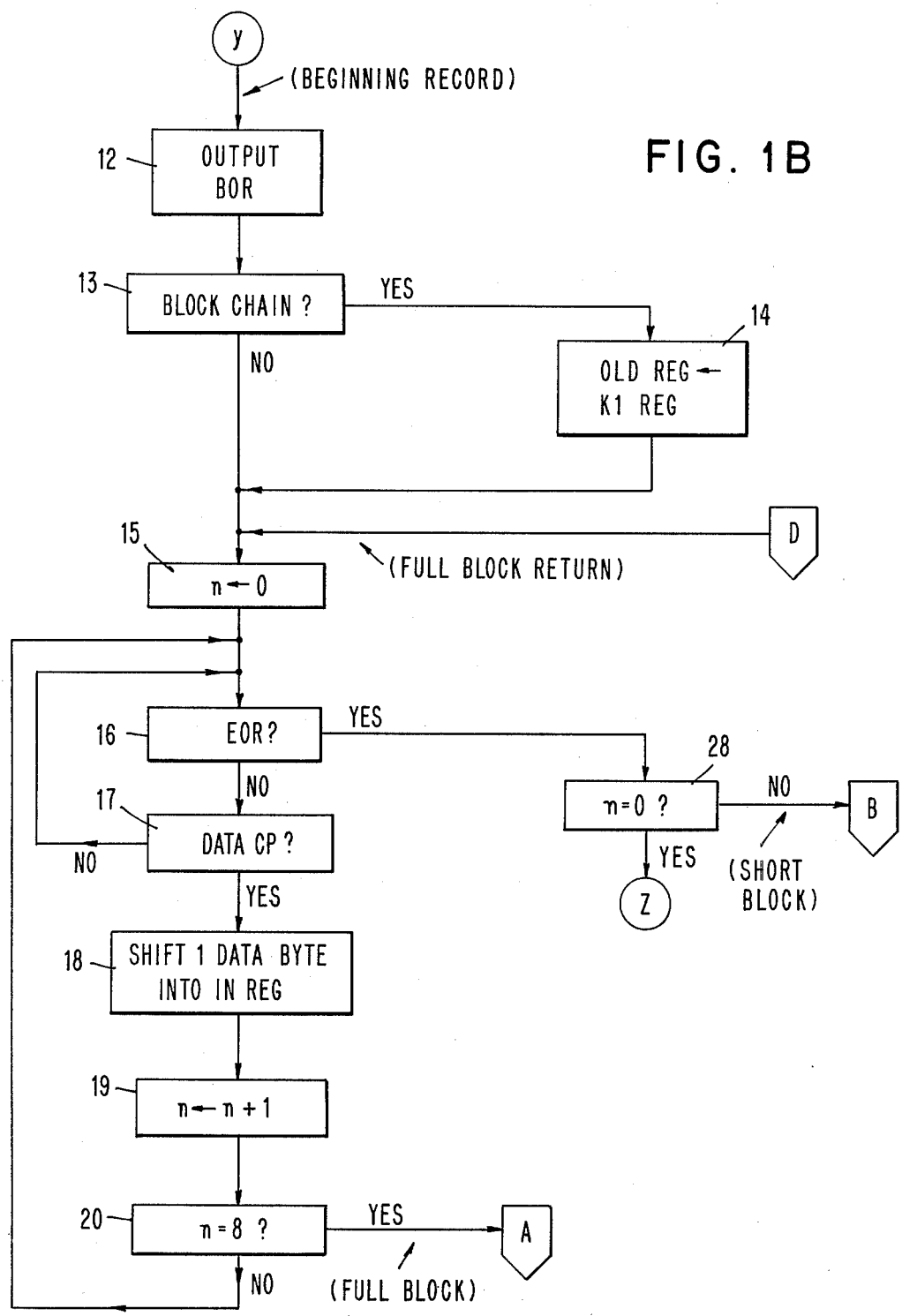

The objects of the present invention are accomplished in part by including a key-controlled block-cipher cryptographic subsystem wherein data input to the system is transormed under control of a unique user supplied binary key K, wherein the transformation may be expressed by the expression $f_K$. In the present invention the output from said cryptographic subsystem is both gated out of the system directly and also returned to the system input where it is combined with a new block of data being input to the system, by a first transformation which is a discrete operation having a right inverse. The result of this first transformation is then reintroduced to the key-controlled block-cipher cryptographic subsystem and the process continued until no further input blocks are available.

According to a further aspect of the system a special short-block cryptographic routine is utilized wherein when a short-block is encountered in the system input, a unique constant or a prior output of the block-cipher subsystem is passed through the block-cipher cryptographic subsystem, and upon completion of the transformation $f_K$, the so transformed constant is combined with said short-block of data via said first transformation. The output of the first transformation which is a short block is then fed directly out of the system together with an indication that it is a short-block.

Use of the present invention removes an apparent weakness in conventional block-cipher cryptographic systems. Assuming that the same key is utilized in each case, a given block of data would always yield the same cryptogram or enciphered data block. Therefore, if some ciphertext blocks are observed to be identical, then the corresponding plantext blocks are known to be identical. If one of these happens to be known, then all are known. Even if none are known, they may be inferrable from statistics or context. For example, in computer source programs, there tend to be numerous blocks of blanks, which will be recognizable in the ciphertext from their repreated pattern.

In an otherwise strong block-cipher system this exposure may not be too serious, and it may not lead to successfu cryptographic analysis of other portions of the ciphertext, but it does reveal some limited information, and may suggest limited guesses about other information.

The present solution to this problem is to combine each plaintext block $x_i$, before encipherment, in an invertible way, with the preceding ciphertext block $y_{i-1}$ or blocks $y_{i-1}$, $y_{i-2}$, ..., and possibly the key K, with some function (not necessarily invertible) of these. The following discussion considers direct dependence on just the immediate preceding ciphertext block $y_{i-1}$, which is a preferred embodiment and is considered to provide adequate protection (in conjunction with a strong block-cipher) to eliminate this problem. However, direct dependence on more than one preceding block, and perhaps also on the key, is not excluded. This process is referred to herein as block-chaining. Mathematically, the encipherment consists of:

(E) $y_i = f_K(x \boxplus g(y_{i-1})) : i = 1,2...$ or equivalently, in more detailed steps:

(Ea): $u_i = g(y_{i-1})$ (Eb): $x_i' = x_i \boxplus u_i$ (Ec): $y_i = f_K(x_i')$ where $f$ is the existing block-cipher; $K$ is the key; $g$ is some discrete-valued function, not necessarily invertible, defined for all cipher-blocks $y$; $\boxplus$ is some dyadic operation, defined for all message-blocks $x$ and all values $u$ of $g$, its values being admissible cipher-blocks, and having a right inverse $\boxminus$, i.e., such that from $x' = x \boxplus u$ and $u$ we can uniquely redetermine $x = x' \boxminus u$; $x_i$ and $y_i$ are the $i$-th plain- and ciphertext blocks; and $y_o$ has been defined in some way, e.g., as some constant K1.

Since $y_i$ depends on $x_i$ and $y_{i-1}$, which in turn depends on $x_{i-1}$ and $y_{i-2}$, etc., it is clear that $y_i$ depends, via $f_K$, on $x_i, x_{i-1},..., x_2, x_1$ and $y_o$, hence on all ciphertext blocks from $x_1$ through $x_i$, i.e. on $x_i$ and "past history". Hence, even if two plain-text blocks, $x_{i_1}$ and $x_{i_2}$, or $x_{i_1}^{(1)}$ and $x_{i_2}^{(2)}$, in the same or different records or encipherment-sequences with the same key, happen to be equal, it is highly likely that their encipherments will be unequal, unless their past histories happen to be identical. This inequality of these ciphertexts is the desired property.

Two special cases of the above formula (E), which can be used are:

1. the function $g$ is the identity, (Ea1): $u = g(y) = y$; and
2. $g$ consists of interchanging the two 4-byte halves of $y$, which is denoted by (Ea2): $u = g(y) = \tilde{y}$; in both cases $\boxplus$ was defined to be $\oplus$, i.e., (Eb) is bitwise addition modulo 2, i.e., exclusive-or-ing; then $\boxminus$ is also $\oplus$. Many other functions $g$ and $\boxplus$ are usable. For example, $u = g(y)$ might be some fixed subset of the bits of $y$, or the sum or exclusive-or of several such subsets, possibly with permutations; $\boxplus$ might be addition with carry, and suppression of overflow, and $\boxminus$ would be the corresponding subtraction; or $x' = x \boxplus u$ might mean $x$ circularly shifted left (or right) by $u$ bit positions, etc. These special cases of (E), for (Ea1) and (Ea2), can be written:

(E1) $y_i = f_K(x_i \oplus y_{i-1}) : i = 1,2,...$ (E2) $y_i = f_K(x_i \oplus \tilde{y}_{i-1}) : i = 1,2,...$ The deciphering formulas corresponding to E, E1, and E2 are as follows;

(D) $x_i = f_K^{-1}(y_i) \boxminus g(y_{i-1}) : i = 1,2,...$ (D1) $x_i = f_K^{-1}(y_i) \oplus y_{i-1} : i = 1,2,...$ (D2) $x_i = f_K^{-1}(y_i) \oplus \tilde{y}_{i-1} : i = 1,2,...$ where $f^{-1}$ is the existing block-cipher in deciphering mode, and $\oplus$ is identical with $\ominus$.

Note the important property that in all cases the decipherment of $x_i$ depends only on knowing $y_i$ and $y_{i-1}$ (and K), not on knowing any earlier $y$'s. Therefore, an error in transmitting or receiving, or in writing or reading, a $y_i$, will cause erroneous decipherment only of $x_i$ (with a large resulting error in the block, due to propagation of the original error through $f_K^{-1}$) and of $x_{i+1}$ (with a "small" resulting error, due to propagation of the original error through $g$ and $\boxminus$), but no other $x$'s. An error in computing a $y_i$ would cause erroneous decipherement only of $x_i$, not even of $x_{i+1}$, even though the subsequent $y$'s would be different from what they would have been otherwise. These properties are important when enciphering either files (whose plaintext would, for security and/or economy, often not have been preserved), or communications which cannot be repeated, since each error causes the unreadability of only one or two blocks, but not of the rest of the file or message. This property of the ciphertext can be called "self-healing" or "bounded error-propagation".

Computer files are frequently subdivided into portions (usually containing one or more blocks) called records. This is clearly illustrated in FIG. 2. It is optional in the present embodiment to either (1) re-initialize the block-chaining at the beginning of each record, or (2) continue the block-chaining from the end of one record into the beginning of the next.

Simple block-chaining has the advantage that each individual record can be deciphered independently of its predecessor. It has the disadvantage that records which happen to have identical first blocks, then perhaps identical second blocks, etc., will have identical encipherments through as many ciphertext blocks as their plaintext blocks agree consecutively.

Record-chaining is probably preferably in most cases. It has the advantage that even identical or identicallybeginning records are enciphered quite differently, and are not recognizable as identical, or even similar. If records are enciphered, and then deciphered, sequentially, from the beginning of the file, there is no associated disadvantage. If records are deciphered, or updated (changed and re-enciphered), out of sequence ("random acess"), then the first block of each record will generally decipher wrongly. All harm from this can be avoided by using the first block of each record as an irrelevant field, whose pre-enciphered value can be arbitrary, and whose post-deciphered value can be ignored.

A further problem with block-cipher systems is that of enciphering records whose lengths are not multiples of the block-length.

One solution would be to pad the records (i.e., to increase their lengths with additional bytes (or bits) to multiples of the block-length. But this requires increasing the lengths of records, and indicating the amount of the padding, both of which may be undesirable, especially in maintaining computer files.

The present invention includes a technique for enciphering the "odd" bytes (or bits) $x_{i,j}$ which comprise a "short" block $x_i = (x_{i,j}; j=1,2,..., L_i < L$ where $L$ is the standard block-length), which does preserve the length $L_i$ of the short-block, and which, of course, must be invertible on the basis of the available knowledge (K, and preferably suitable information dependent on some previous x's and/or y's).

If length is to be preserved, it would not do to put $x_i$, however padded, through the block-cipher; for the encipherment, of length $L$, would have to be truncated to length $L_i$, and $x_i$ would not be recoverable ny decipherment without the discarded part of the encipherment.

In the present embodiment a short-block of the form: $x_i = (x_{i,j}; j=1,...,L_i)$ is enciphered by a rule of the type:

(E') $y_i x_i \triangle h(K,y_{i-1})$ where $h(K,y_{i-1})$ is some key-dependent function (not necessarily invertible) of $y_{i-1}$ (and possibly of earilier y's, but there seems no need for this), and $\triangle$ is a dyadic operation, defined for all short-blocks $x_i$ and all values of $h$, and having a right inverse $\triangle$, so that we can recover $x_i$ from $y_i$ and $h(K,y_{i-1})$, see (D') below.

One difference between $\boxplus$ and $\triangle$ is that $\boxplus$ operates on $x_i$ of length $L$, while $\triangle$ operates on $x_i$ of any length $L_i < L$. In this embodiment exclusive-or $\oplus$ is used for both, but for $\boxplus$ the $\oplus$ operates on the full right-argument, while for $\triangle$ it operates on only the first $L_i$ byte or bits of the right-argument.

The function $h(K,y_{i-1})$ should not be simply a constant, key-dependent or not, since sufficiently many short blocks of ciphertext would permit the recovery of this constant, and hence of the short blocks of plaintext, by well-known statistical and contextual techniques, and known constraints on the possible plaintext; hence it should vary from one encipherment to another, which is why it has been made to depend on $y_{i-1}$.

It cannot depend simply on $y_{i-1}$, i.e., $h(K,y_{i-1}) = h(y_{i-1})$, since $y_{i-1}$ is visible to an opponent, and the function $h$, like all cipher algorithms, should be assumed to be public knowledge. Hence, it must depend on $y_{i-1}$ in a way which is known to the legitimate user, but not to an opponent, i.e, in a key-dependent way. At least two ways are possible, analogous to those used for chaining of full blocks:

(1) $h(K,y_{i-1}) = f_K(y_{i-1})$ (2) $h(K,y_{i-1}) = f_K(\tilde{y}_{i-1})$

Also analogous to the chaining of full blocks, the operation $\triangle$ is chosen to be exclusive-or-ing, $\oplus$, but after first truncating $h(K,y_{i-1})$ to length $L_i$; but not that unlike the chaining of full blocks, the operation $\triangle$ or $\oplus$ is applied after a use of $f_K$, rather than before. Thus:

(E'1) $y_{i,j} = x_{i,j} \oplus (f_K(y_{i-1}))_{,j}: j=1,...,L_i$ (E'2) $y_{i,j} = x_{i,j} \oplus (f_K(\tilde{y}_{i-1}))_{,j}: j=1,...,L_i$ where $(...)_{,j}$ means the $j$-th byte (or bit) of the expression in $(...)$.

For consistency with the case of block-chaining, method (2) has been preferred, but the choice between (1) and (2) is not important. It *is* important, for cryptographic security, that the function $h(K,y)$ be such that $y$ is not readily deducible from $h(K,y)$ without knowledge of K, and also that $h(K,y)$ shall preferably contain at least as many apparently independent bits as the longest short block (a length L, as produced by $f_K$, will suffice).

The corresponding deciphering formulas are:

(D') $x_i = y_i \triangle h(K,y_{i-1})$ (D'1) $x_{i,j} = y_{i,j} \oplus (f_K(y_{i-1}))_{,j}: j=1, 1, \ldots, L_i$ (D'2) $x_{i,j} = y_{i,j} \oplus (f_K(\tilde{y}_{i-1}))_{,j}: j=1, \ldots, L_i$ Notice that in deciperhing a short block we perform an encipherment step.

If record-chaining is not used, and if the block is at the beginning of a record, and hence is the entire record, (i.e., if the record is a "short record", shorter than a block in length), then for consistency with (E) or (E1) or (E2) the rule (E') or (E'1) or (E'2) is used, with $y_o$ defined as in block-chaining (but note that $y_o$ undergoes an additional encipherment). This will result in all short records being enciphered by "addition", according to $\triangle$ or $\oplus$, of a fixed key-dependent constant $h(K, y_o)$. As noted earlier, such data, in sufficient quantity, are subject to cryptanalysis, revealing the constant, and thus the plaintext of the short records. This should not, however, compromise the longer records, except by context, if the block-cipher is sufficiently strong.

If, however, record-chaining is used, as recommended, then for chaining into the first block (whether full or short) of each record after the first one, instead of $y_o$ there is used the latest value $v$ which emerged from the block-cipher subsystem during the encipherment of the just-previous record.

This record-chaining mode of operation causes even short records to be enciphered as strongly as long ones; and identical short records will in general, as desired, have distinct encipherments, because of the generally distinct v's which are chained into them.

The above-described procedures for chaining into full and short blocks, and within and between records, can be notationally unified by using the just-introduced notation, $v$, standing for "chaining-value", for a block-valued variable which on each initialization is set to $y_o = K1$, and thereafter assumes the latest value which has emerged from the block-cipher subsystem during the encipherment of the latest block, whether full or short. If the block was a full block, and $v$ is the resulting ciphertext y. If it was a short block, then v is the re-encipherment of the previous v (or v̂), and was made for combining with the short plaintext x to produce the short ciphertext y. In terms of this v, the previous descriptions and formulas are unified as follows.

When initialization is to occur (namely at the beginning of each record, for block-(but-not-record)-chaining, or of each file, for (block-and)-record-chaining, it can consist, both for enciphering or deciphering, or the assignment:

$$v = y_o = K1$$

Thereafter (until the next such initialization), encipherment or decipherment and the updating of v follow the following rules:

For encipherment:
For each full block $x_i$:

$$u = g(v)$$

$$x'_i = x_i \boxplus u$$

$$y_i = f_K(x'_i)$$

$$v = y_i$$

For each partial block $x_i = (x_{i,j} : j = 1,2, \ldots, L_i < L)$:

$$u = g(v)$$

$$v = f_K(u)$$

$$y_i = x_i \triangle v$$

For decipherment:
For each full block $x_i$:

$$u = g(v)$$

$$x'_i = f_K^{-1}(y_i)$$

$$x_i = x'_i \boxminus u$$

$$v = y_i$$

For each partial block $y_i = (y_{i,j} : j=1,2,\ldots,L_i < l)$:

$$u = g(v)$$

$$v = f_K(u)$$

$$x_i = y_i \triangle v$$

The preceding theoretical discussion of the present improvement to a block-cipher cryptographic system sets forth the underlying philosophy of the present approach to improving the cryptographic security of such a system.

Figure 4B:
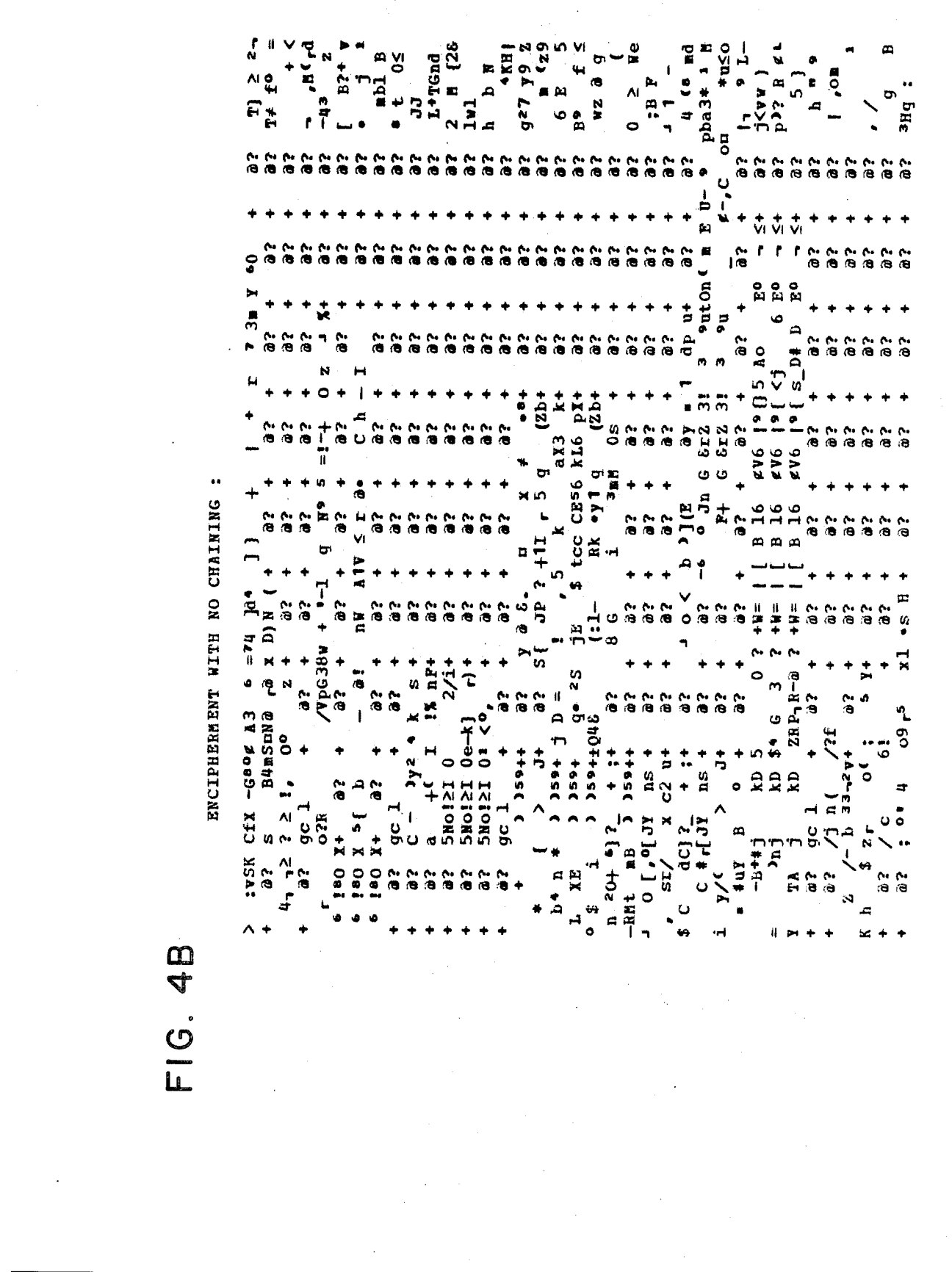

The improvements in the cryptogram are seen quite clearly in FIGS. 4A through 4E. In FIG. 4A a typical data file (i.e. a series of program statements) is illustrated in plaintext form which, as will be seen, contains a great many blank spaces as is typical of such a data printout. The significance of these many blanks are that they form a number of identical blocks within the file, and the resulting encryption of such a file shows a great deal of redundancy or repetition as is evident from the initial cryptogram illustrated in FIG. 4B wherein the concepts of the present invention are not applied. That is to say there is no ciphertext chaining utilized in the example of FIG. 4B.

Figure 4C:
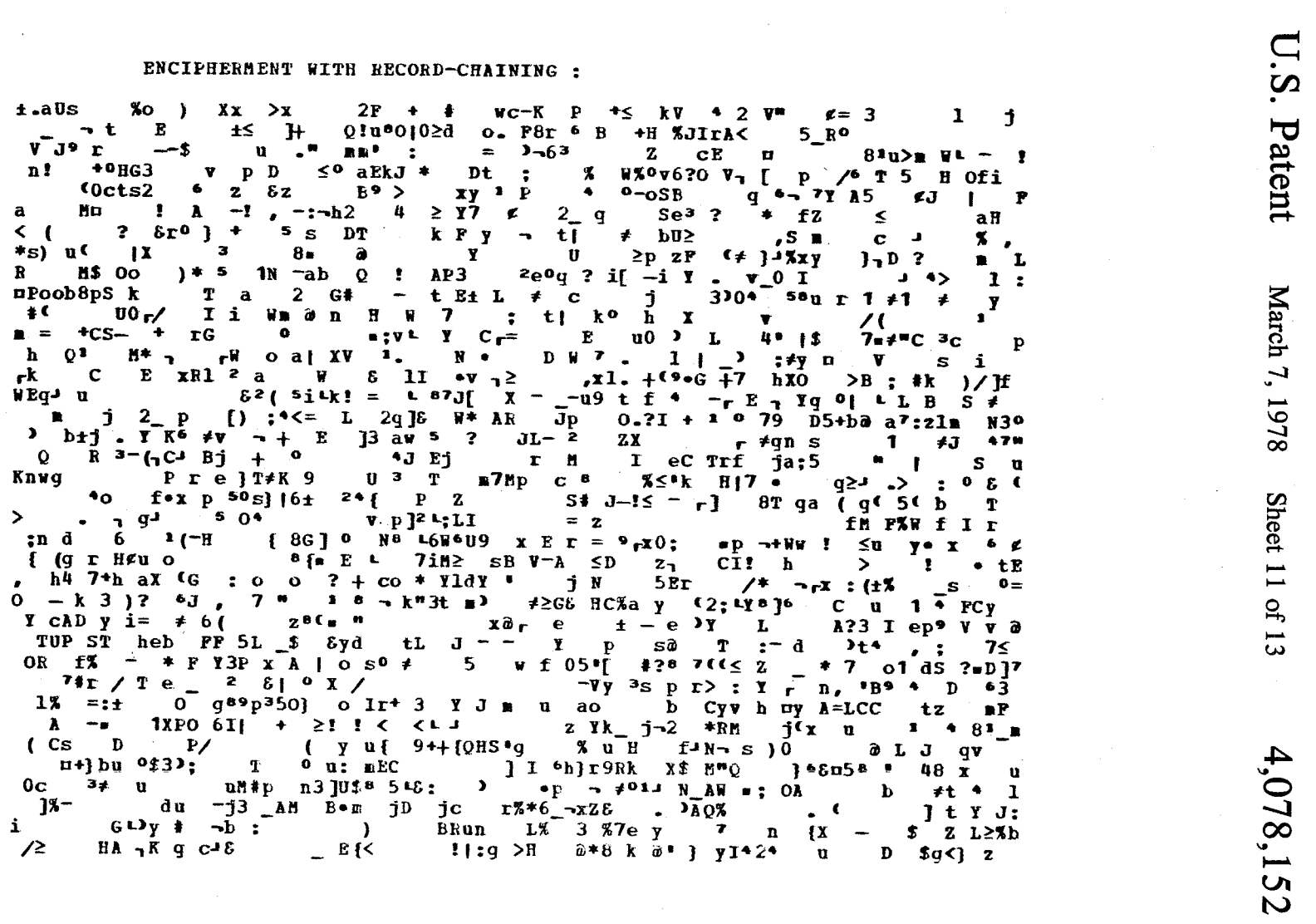

FIG. 4C clearly illustrates the advantages of the present invention wherein the concept of record-chaining has been applied. As will be remembered from the preceding description, record-chaining is simply a particular case of ciphertext block-chaining. With record-chaining, the chaining is also continued across record boundaries. In the data example illustrated in FIG. 4A each line would typically be a record, and the use of record-chaining merely continues the ciphertext block-chaining continuously through the entire data file which is represented on the page. Thus, the repetitions are no longer evident.

Figure 4D:
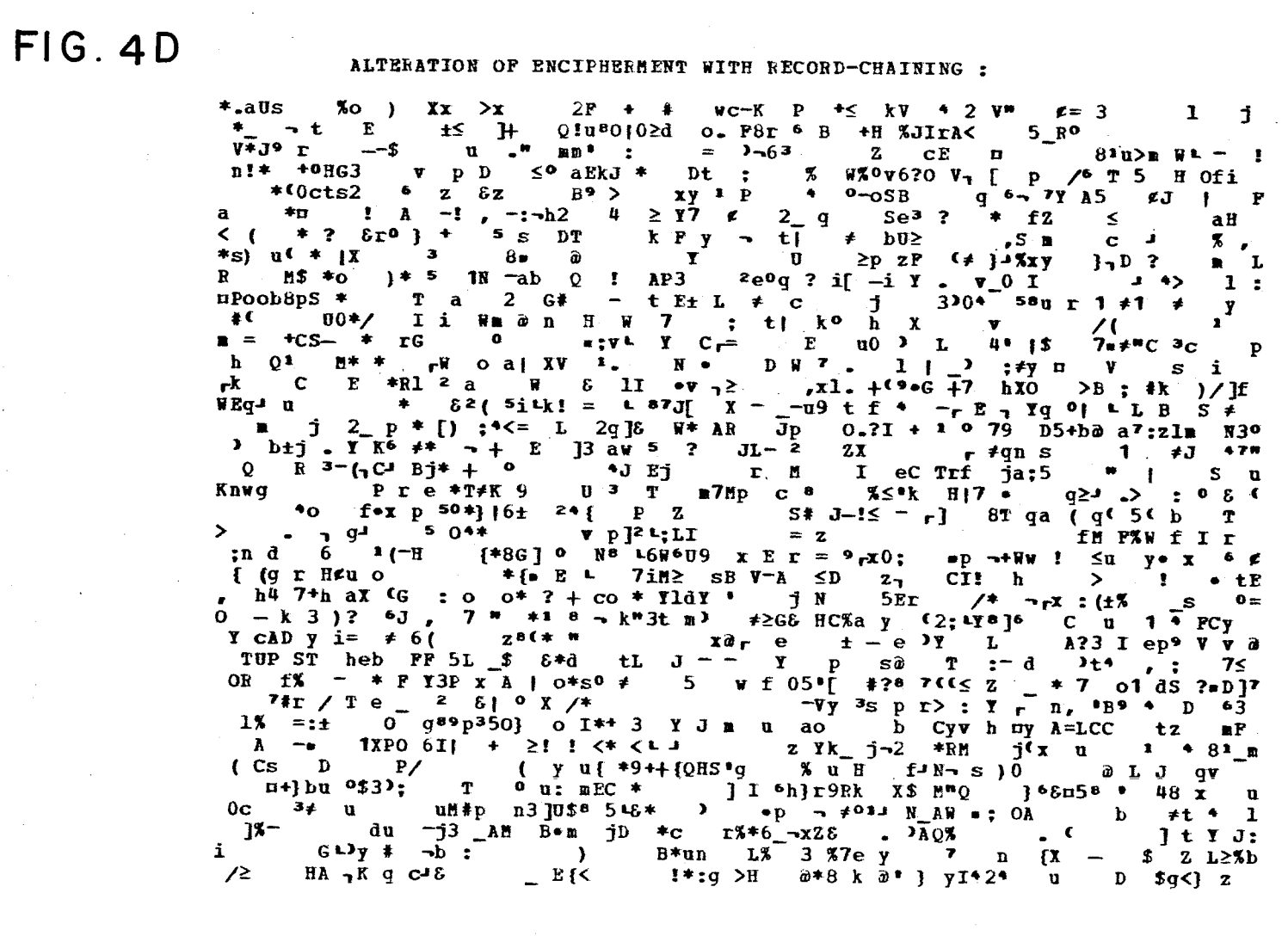

FIGS. 4D and 4E illustrate a further aspect of the present invention which was described previously, i.e., the limited error propagation with the present invention when errors are introduced in the system. In the example of FIGS. 4D and 4E it is assumed that errors are introduced somehow in the encryption. Upon examination it will be noted that FIG. 4D differs from FIG. 4C in that asterisks appear diagonally from the upper left-hand corner going toward the bottom of the illustrated printout, constituting the introduced errors. FIG. 4E which is a decipherment of the corrupted cryptogram illustrated in FIG. 4D illustrates the limited error propagation. When FIG. 4E is compared with FIG. 4A it will be noted that only a limited error is present in each line. This, as will be remembered from the previous discussion, represents a severe error in one block and a much smaller error in the adjacent block as was described in the discussion.

Figure 2:
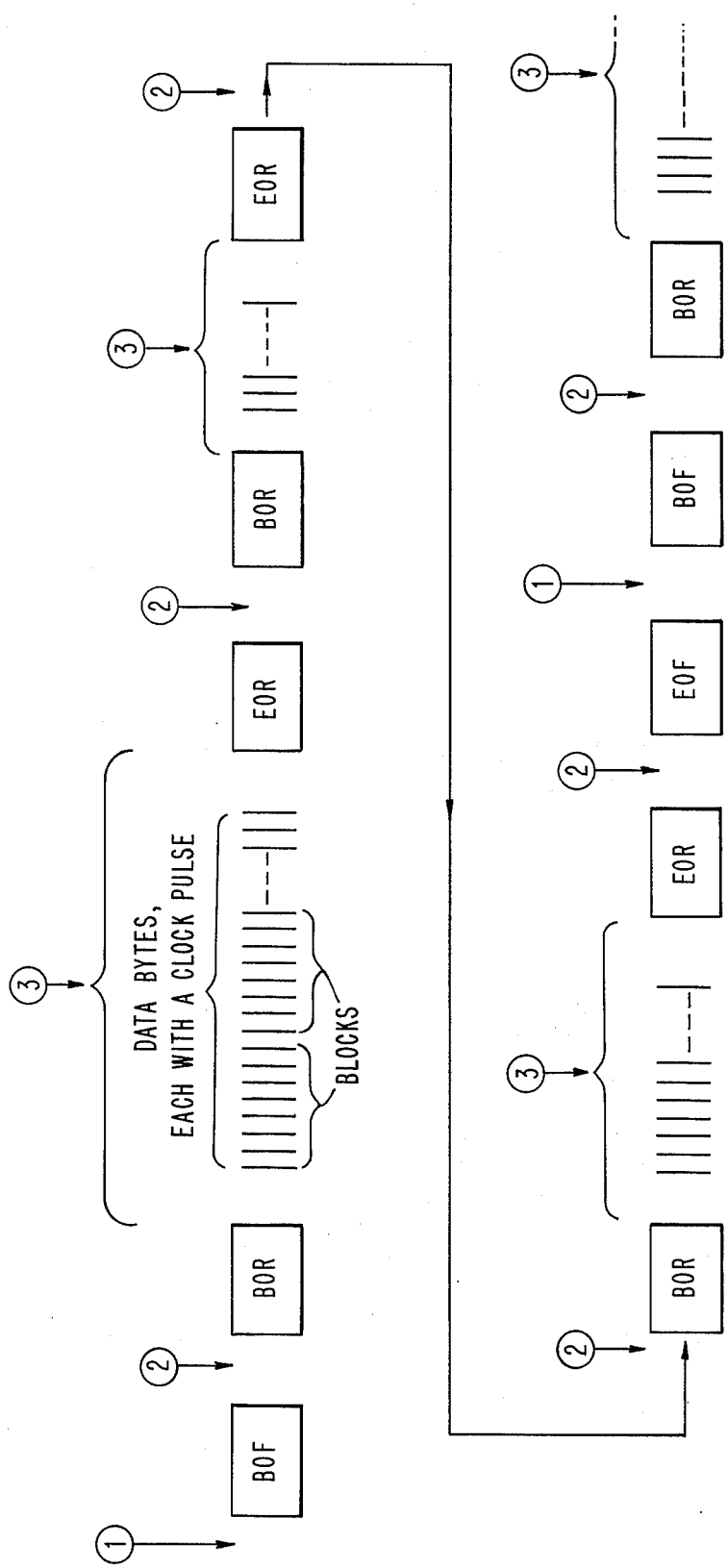
FIG. 2 comprises a diagrammatic representation of the data format utilized with the present system.

It should be noted in passing that the particular data format illustrated in FIG. 2 is shown by way by example only and that it conforms to common usage in the computer industry wherein records and files frequently have the particular beginning and end marks illutrated, or equivalent methods of demarcation. Further, data bytes are illustrated as including a clock pulse therein. This is also a widely used convention. The present embodiment is designed to operate utilizing this format and indeed all of the controls and timing circuits require such a format for operation. However, it should be clearly understood that this data format and requisite control do not form a basic part of the present invention, which relates to the concept of ciphertext chaining in comnbination with a sophisticated block-cipher cryptographic subsystem.

There will now follow a detailed description of the flowcharts of FIGS. 1A through 1D, which illustrate very clearly the operation of the present invention, and more particularly the disclosed embodiment. In addition to the specific reference to FIGS. 1A through 1D which constitutes said flowchart, reference is made to the hardware embodiment drawing of FIGS. 3A through 3C. A description of the operation of the embodiment follows the description of the flow charts and finally a listing of the micro program sequences necessary to effect the operation of the hardware is included together with a description of the operation thereof.

DESCRIPTION OF THE FLOWCHARTS

Figures 1, 1C:
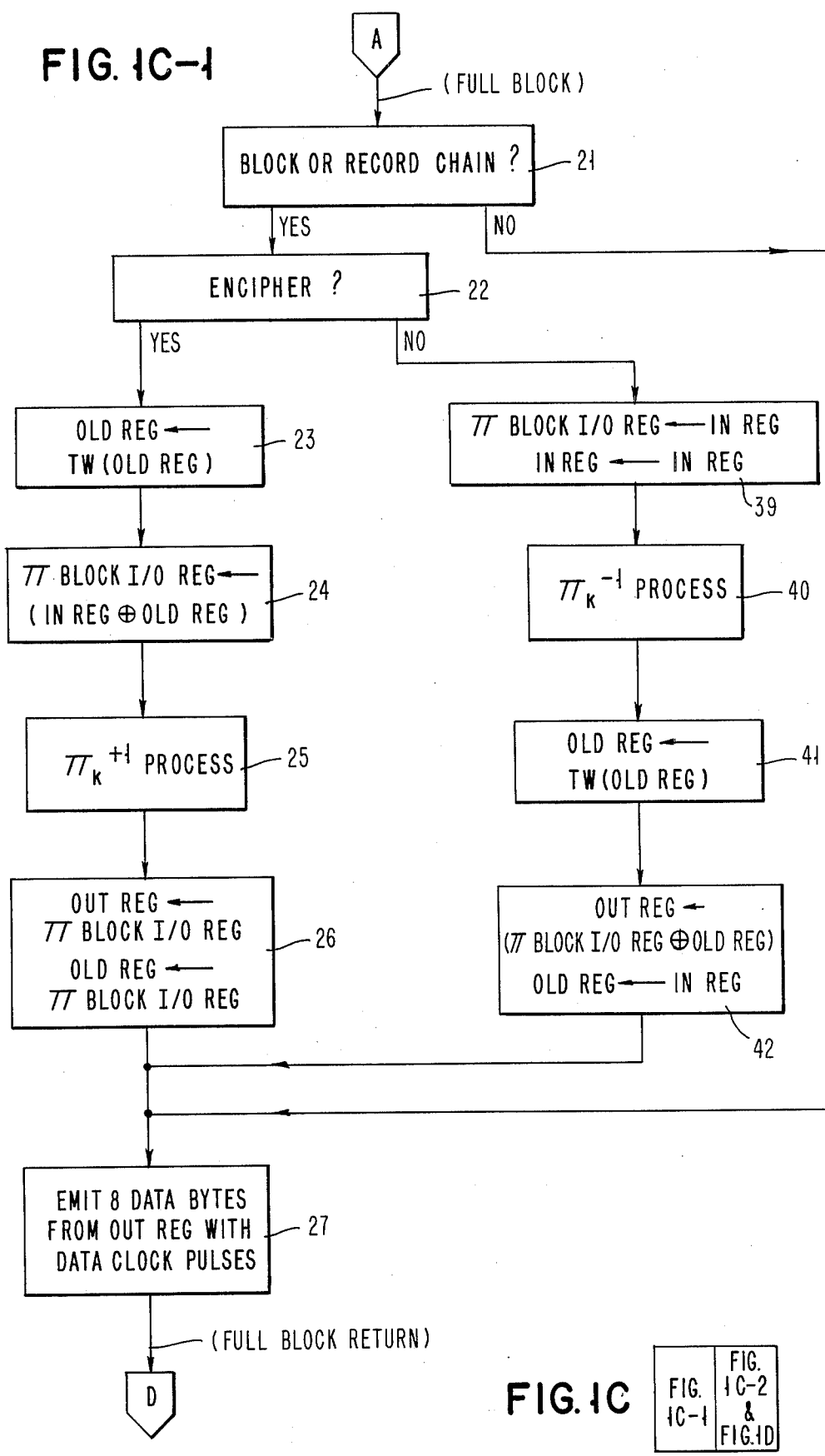

The present description and flowcharts of FIG. 1 assume that the data to be enciphered or deciphered is available in a stream in a discrete (digital) form, and is partitioned in some manner into substreams of such data, which are referred to herein as records are, or may be, grouped into larger groups called files. Such a format is illustrated in FIG. 2. This data might be available for example on a storage medium, or be transmitted along a communication line. FIG. 2 clearly illustrates that the data arrives at the hardware of this system in the form of successive bytes, that is parallel groups of eight bits, each byte accompanied by a data block pulse (not shown). The bytes which comprise a record are preceded by a beginning-of-record or BOR mark or signal, and followed by a matching end-of-record EOR signal. A file consists of one or more such records and is preceded by a beginning-of-file or BOF signal and followed by a matching end-of-file or EOF signal. It is assumed that the data, pulses and signals arrive at the hardware of the system in the sequence just described. This can be insured, if necessary, by suitable preprocessing, and error detecting and correcting circuitry.

Under these assumptions, at any time between the arrival of data or marks the circuitry can be considered in one of three major states, as indicated in FIG. 2. State One constitutes a situation "between files", including the cases of being before all files or after all files; each BOF, if any, has been matched by a corresponding EOF. State Two constitutes a situation of "between records", including the cases of being before the first or after the last record of a file; a BOF has been received which has not been matched by an EOF, but any subsequent BORs have been matched by EORs. State Three constitutes a situation "within a record", a BOR has been recevied, and any amount of data (perhaps none), but the matching EOR has not yet been received. It can be seen from FIG. 2 that in state One a BOF is expected as the first signal to arrive, and its arrival takes the system to state Two. In state Two either a BOR is expected, which will take the system to state Three, or an EOF, which will take the system back to state One. In state Three either a byte of data, accompanied by a corresponding data clock pulse, to be desribed, is expected, which will be processed and will still leave the system in state Three; or an EOR, which will take the system back to state Two. These states, especially state Three, have further subdivisions into substates (which will not be described explicitly), depending for example upon how many bytes have been received, what kind of chaining is being done, and so forth.

Figure 3A:
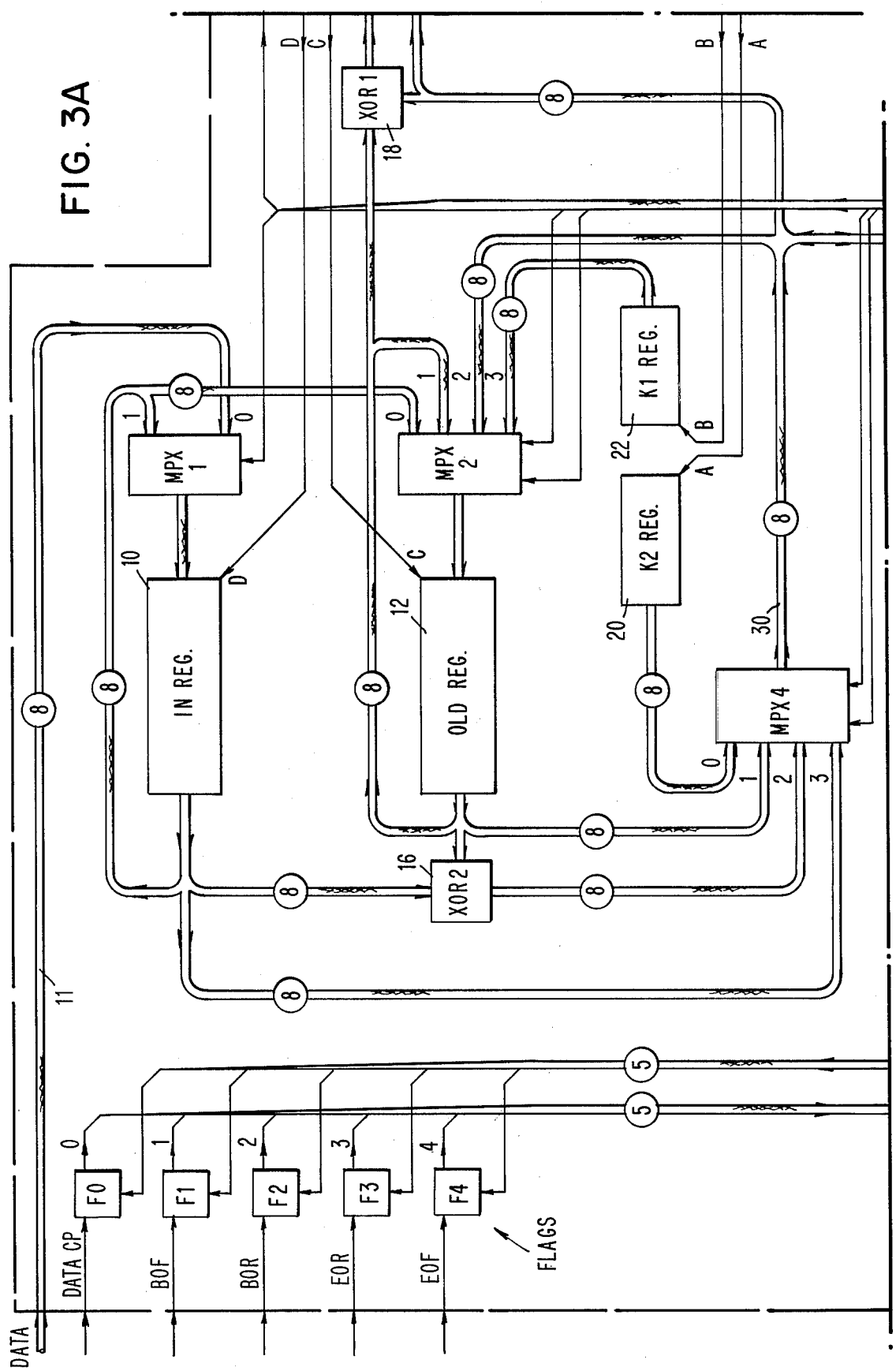
FIG. 3A through 3C comprise a combination functional block and logical systematic diagram of a preferred embodiment of the present cryptographic system.

Now referring to FIGS. 1A through 1D, and FIGS. 3A through 3C there may be seen at the upper left of FIG. 3A a byte-wide input data bus 11, and five one-bit signal lines called, Data Clock Pulse or Data CP, and BOF, BOR, EOR, and EOF. It is assumed that the file or communication line or preprocessor is such that at any time, either none of these one-bit lines is energized, or exactly one of them is energized; and if this one is the Data Clock Pulse line, then a byte of data is available on the byte-wide data bus. Thus, the sequence of signals on the five one-bit control lines corresponds to the sequence of record and file marks and data bytes indicates in FIG. 2. It is further assumed that the circuitry shown in these diagrams, and to be described, operates sufficiently rapidly compared to the communication line that each input signal can be processed and rest before the next input signal arrives. Notice that the circuitry has, at the right of FIG. 3C, a corresponding set of five one-bit output signal lines and one output data bus 13. It will be shown in this description that the circuitry is so arranged that the sequence of record and file marks and of data bytes and data clock pulses will be the same for the output as for the input. However, the actual data bytes will be different because the output data is either the encipherment or the decipherment of the input data.

Figure 3B:
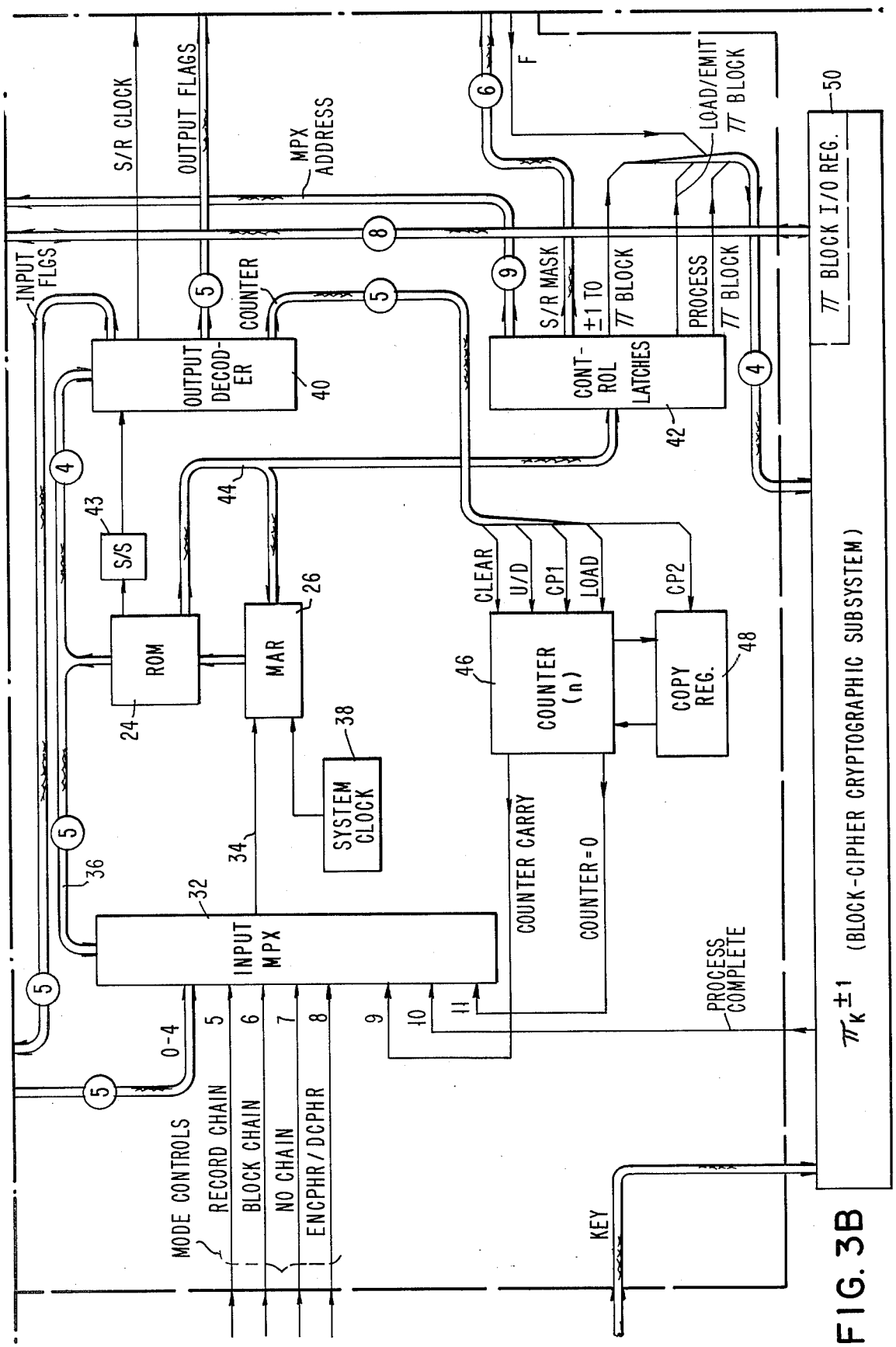

It will further be seen at the left of FIG. 3B that there are four mode-control inputs, one each for no-chaining, block-chaining and record-chaining, and one for encipherment or decipherment; and a key-input-bus. For each file (or group of files) these four lines and bus are pre-set to specify the mode options to be taken and the key to be used, and are latched, either externally or internally, during the processing of the file.

Of the three lines for chaining options, just one will be energized. In the block-chaining option, chaining is done from block to block (where a block is the amount of data which is input to, and output from, the block cipher cryptographic subsystem, or else is a smaller amount of data remaining at the end of a record); and we reinitialize the chaining at the beginning of each record. In the record-chaining option, chaining is also done from block to block, but the chaining is reinitialized only at the beginning of each file, not at the beginning of each record. Both of these modes are included in the disclosed system. The no-chaining option provides a bypass mode, under which the encipherment of blocks will be simply that of the block-cipher, without any chaining. Its presence is a convenience, for compatability, but is not essential.

The remaining line is to be put into one state is encipherment is desired, and into the other state if decipherment is desired.

The operational flow diagram of FIGS. 1A through 1D will now be described box by box, from a functional standpoint. When the equipment is first activated, it is in state One. Control commences at box 1. It passes to box 2, where any desirable initialization takes place, such as the clearing of the input flags and data bus. Control then passes to box 3, where a test is made as to whether the expected BOF signal has arrived. If it has not, the 'no' path is taken, control returns to box 3, and the test is made again. When the BOF signal arrives, which has been assumed must be the first signal to arrive, it will be latched into the BOF flag F1 in the hardware (FIG. 3A), and will be detected at box 3, at which time the flag will be turned off so as not to cause future confusion, and control wil pass to box 4; the later latching and testing of other flags is analogous. During this transition we are beginning a file, and are changing from state One to state Two. In box 4, an output signal is produced on the output BOF line, thus beginning the correspondence between output and input formats.

At box 5 a test is made to see whether chaining (that is, either block-chaining or record-chaining) is to be performed, as will normally be done by this circuitry. If so, control proceeds to box 6. Here register 12 of FIG. 3A called 'old reg', which is to contain the chaining-value v which is preserved from one block encipherment to the next in order to accomplish the chaining, is initialized by being set to a suitable constant K1. The choice of this constant is not crucial, but in rare cases it might slightly affect the recognizability, form the ciphertext, of certain not very significant portions of plaintext. It could be taken to be zero. In the particular embodiment to be described it was taken to consist of 64 bits, alternately binary 1's and 0's, or equivalently of 16 hexadecimal '5's.

If the decision at box 5 was for no chaining, that is, to bypass the block- (and record-) chaining of this disclosure, nevertheless 'old reg' will be filled with a constant to permit the encipherment of short blocks, that is, of blocks consisting of fewer than eight bytes. This constant must be key-dependent for the desired key-dependent encipherment, and in the present embodiment the encipherment is formed by the block-encipherment of some constant K2 which again is fairly arbitrary and which is again chosen to be 64 bits of alternate binary 1's and 0's or 16 hexadecimal '5's.

The encipherment process is here represented, as throughout this flow diagram, by three boxes, in this case boxes 7, 8 and 9, to adapt to the protocol of the Block-Cipher Cryptographic Subsystem ($\pi$ block-cipher), which executes the functions $f_K$ and $f_K^{-1}$. In this subsystem, as shown in FIG. 3B there is a single register, Register 50 called $\pi$ block I/O register, used for both input and output; a bus for loading the key; and several control lines. To use the $\pi$ subsystem one inputs the plaintext or ciphertext block to its input/output register, signals for an encipher ($\pi_K^{+1}$ or $f_K$) or decipher ($\pi_K^{-1}$ or $f_K^{-1}$) operation, and outputs the resulting ciphertext or plaintext from the same input/output register. These three steps are shown in the flow diagram in boxes 7, 8 and 9. In box 7, the input/output register is loaded with the specified constant K2, in box 8 the encipherment is accomplished, and in box 9 the input-/output register is read out into 'old reg'. The three boxes together accomplish the encipherment of K2 into 'old reg'.

Regardless of whether chaining was chosen or not at box 5, control passes from box 6, or box 9, to box 10, and the appropriate initialization of 'old reg' has been accomplished Box 10 may also be entered from box 29, as discussed later. In either case, the system is still in state Two, which has been called "betweeen records", and the next input signal is expected to be either an EOF or a BOR. (Since the preceding input siignal was a BOF, an EOF would not normally be expected yet, but there is no harm in permitting it or in testing for it; later the test will be needed.) The combination of boxes 10 and 11, with feedback from 11 to 10, waits for the first occurrence of one of these. If this is an EOF, there is a 'yes' exit from box 10, which will be dscussed later. If it is a BOR, there is a 'yes' exit from box 11 to box 12, at which point state Three, "within a record", has been entered, and a BOR is emitted to again make the output correspond to the input.

At box 13, a test is made to see if block-chaining is being performed. If the decision is 'yes', control goes to box 14, to again initialize 'old reg' to K1. For the first record in a file this initialization is redundant, since it way already done at box 6, and it could be omitted by some alteration of the flow; but for later records in a file it is essential. Control then proceeds to box 15. If the decision at box 13 is 'no', control proceeds directly to box 15, without altering 'old reg'; for either there is no-chaining, in which case 'old reg'should retain the constant value which it was assigned at box 9, or else there is record-chaining, in which case 'old reg' should retain whatever value which it was last set to, elsewhere in the flow diagram, as discussed previously and to come.

Box 15 can also be reached via connector D for box 27, after the input, encipherment, and output of a full eight byte block, as will be discussed later. In any case, at box 15 the system expects to receive zero or more Data Clock Pulses with their associated data bytes, terminated ultimately by an EOR, and the larger aim is to read successive data bytes into 'in reg'(10 of FIG. 3A) until either eight bytes have been read in, or an EOR is received, whichever occurs first. First, at box 15, the byte counter for N (46 in FIG. 3B) is set to zero. Then in the feedback loop of boxes 16 and 17 the system looks for the first occurrence of a Data Clock pulse or an EOR. Suppose that the first occurrence is a Data Clock Pulse; the 'yes' exit from box 17 will lead to box 18, where one input data byte will be read into 'in reg' and the Data Clock Pulse flag FO (FIG. 3A) will be turned off. At box 19 the byte count is incremented by one, and at box 20 it is compared to eight. If N is less than eight, control will return to box 16 where the wait for an EOR or a Data Clock pulse will be repeated. If eight successive Data Clock Pulses are received prior to receipt of an EOR, a full eight-byte block of input data has been received and should be processed. Control proceeds from box 20 via connector A to box 21. Here the system tests whether chaining (either block- or record-) is being performed. It it is, as would normally be the case with this system, control proceeds to box 22, where the encipher/decipher mode-control input is tested.

Suppose that the mode is "encipher". Control proceeds to boxes 23 and 24, where the encipherment-chaining, the heart of the present invention, takes place. On the first entry into box 22 after the initialization of 'old reg' at 6, or at box 14 in the case of block chaining, 'old reg' contains K1, that is, $y_o$ as described previously. On other entries to box 22, 'old reg' will contain the last enciphered output from the block-cipher cryptographic subsystem, as will be seen later. In both cases, 'old reg' contains the chaining-value $v$ described previously. Generally, that is after processing a just-preceding full block of input, this last value will be the preceeding either-byte ciphertext block, which has been called $y_{i-1}$ previously. However, if the mode is record-chaining, and if there have been one or more short blocks, say K of the, without an intervening full block, then 'old reg' will contain the Kth successive re-encipherment of the last full ciphertext block, or of K1 if there has been no full output block in this file.

Box 23 accomplishes the evaluation $u = g(v)$ of the function $g$ described previously. This function could be any cryptographically adequate and engineering-wise covenient discrete-valued function, for example, the identity, $g(v) = v$, or taking a fixed subset of the bits of $v$, or adding or exclusive-or'ing various subsets of the bits of $v$, etc. In the present implementation the function $g$ was chosen to be a "twiddle", $g(v) = \overset{\backslash}{v}$, by which is meant an exchange of the first 32 with the last 32 bits of $v$. This function was chosen to circumvent a minor aesthetic annoyance, in that for four out of all the possible keys, for the particular block-cipher cryptographic subsystem mentioned, namely the key with all bits 0, the key with all bits 1, and two other keys, a succession of two or more blocks of all 0 bits of plaintext would yield a pattern of two identical blocks of ciphertext, separated by one block.

In the choice of the function $g$, however, it is essential to preserve enough variability that the values $u$ of the function are unlikely to be soon repeated, othewise the desired variability in the ciphertext for repeated plaintext patterns will not be achieved. In this embodiment, the full 60 bits of potential variability are preserved.

In box 24, the contents of 'in reg' is the plaintext block $x_i$, the contents of 'old reg' is $u = g(v)$, and the exclusive-or operation is an example of the operation $\boxplus$, shown in formula E, et seq., of the preceding algorithm description. The result of this operation is called $x_i'$. An essential feature of the operation $\boxplus$, to enable decipherment to be possible, is that it have a right inverse $\boxminus$, that is, that it be invertible with respect to its right operand, that is, that knowing the right-hand argument $u$, from $x_i' = x_i \boxplus u$ and $v$ it is possible to redetermine $x_i = x_i' \boxminus u$. An additional cryptographically desirable property of $\boxplus$ is that, for a given $x$, which may be repeated at various places in the plaintext, the possible values of $x'$ are very unlikely to be repeated, and hence, because of the complicated nature of the block encipherment in the block-cipher crytographic subsystem, the resulting values of $y$ are almost certain to be unrecognizably different.

In the present implementation the operation of exclusive-or'ing $x_i$ with the 64 bit $u = g(v)$ preserves the full 64-bit potential variability of the right-hand argument. The inverse of exclusive-or is another exclusive-or.

An equally valid combining operation would be addition with carry, ignoring overflow. Its inverse would be subtraction with borrow, ignoring negative overflow. These operations would be unnecessarily more complicated than exclusive-or in the preferred implemention, but they might be more suitable in hardware which happened to have addition and subtraction, but not exclusive-or, as basic operations.

Another typical pair of functions $g$ and $\boxplus$ would be for $g$ to consist of taking a specified six bits $u$, or the exclusive- or $u$ of specified sets of six bits, from $v$, and for the operation $\boxplus$ to consist of a left circular shift or a right circular shift of $x$ by that number $u$ of bit positions. This would give 60 possible values of $x'$ for each value of $x$.

Having constructed $x_i$ and put into the $\pi$ block I/O register in box 24, the system proceeds to enccipher it (i.e., execute $\pi_K^{+1}$ or $f_K$) in box 25, and in box 26 it reads the resulting ciphertext $y_i$, both into the output register 'out reg' (14 in FIG. 3C) and into 'old reg' for use as $v$ in chaining into the next block. In box 27, the resulting eight bytes of ciphertext are output, each with its corresponding clock pulse. At this point, control is returned via connector D to box 15.

At box 15, the system again awaits the receipt of subsequent Data Clock Pulses, with resulting counting and processing of the corresponding data bytes, and/or the receipt of an EOR. As long as Data Clock Pulses and bytes continue to arrive without an EOR, each eight of them will be enciphered as a block, as just described. Thus zero, one, or more full eight byte blocks of input data will be processed.

Eventually an EOR will be detected at box 16, and control will go to box 28. If N equals zero, however many eight-byte blocks have just been processed, no additional bytes were received in the record; that is, the length of the record was an exact multiple of eight bytes. Control passes via connector Z to box 29, where an EOR is output, to match the one that was input, and then to box 10, to again await an EOF or a BOR. This arrival at box 10 from box 29 will be discussed further below. On the other hand, if at box 28, N is not equal to zero, then however, many eight-byte blocks have just been processed, an additional N bytes (at least one, and fewer than eight) were received in the record, whose length is thus not an exact multiple of eight bytes. In this case the system has to encipher a short block, of N bytes. For this, control is transferred to box 30. At box 30 the byte count N is copied into the copy register (48 in FIG. 3B), for reuse after later destructive processing in the counter. At box 31, the system tests for the chaining mode. If there is chaining (either block- or record-), as intended in this invention, control passes to boxes 32, 33 and 34, which together cause the contents $v$ of 'old reg' to be replaced by $f_K(g(v))$, and control passes to box 34, where the N input bytes are left-adjusted in 'in reg' under control of the byte counter.

In box 36 the left-adjusted data is then exclusive-or'ed with the contents $v$ of 'old reg' (which contents $v$ are also preserved in 'old red'), and in box 37 the resulting N bytes of ciphertext, with their corresponding block pulses, are output from 'out reg' (using the value N which was preserved in the copy register). The purpose of exclusive-or'ing the input data, rather than passing it through the encipherment of the $\pi$ block-cipher, is to achieve a ciphertext of the same number of bytes as the plaintext, and to be able to recover the plaintext from it. If instead the short plaintext block were padded to eight bytes and passed through the $\pi$ block-cipher, the resulting ciphertext would be longer than the original plaintext, which is undesirable in some applications, and such ciphertext could not be truncated to the original length and still be decipherable. The contents of 'old reg' with which the system exclusive-ors the plaintext is a complicated function, via the $\pi$ block cipher, of all the preceding full blocks in the same record (for block-chaining) or the same file (for record-chaining) and thus usually varies from one block to another, making the encipherment strong even for short blocks.

From box 37 control proceeds via connector C to box 29, where an EOR is output, and thence again to box 10. Control can also arrive at box 10, via box 29, from box 28, after completion of a record consisting of a multiple of eight bytes, as already described; the two cases have merged, and in both cases the system has returned from state Three to state Two.

In the wait loop of boxes 10 and 11, if the first signal received is a BOR, then the system is starting a new record in the same file, and returns from state Two to state Three. 'Old reg' will be reset to K1 in box 14 if block-chaining is in effect, but not reset if record-chaining (or no-chaining) is in effect. This new record, ans subsequent records in the same file, will then be processed just as has been already described.

On the other hand, the eventual arrival of an EOF at box 10 causes control to proceed from box 10 via connector X to box 38, where an EOF is output, and then to return to box 2, indicating a return from state Two to state One, "between files". The system is then prepared to process to the next file in the same fashion, and so on.

So far it has been largely assumed that the system is in block- or record-chaining mode, with encipher mode. Now consider block- and record-chaining, with decipher mode. The flow of control is the same as just described, up to box 22, where it will now proceed to box 39.

At this point it must be emphasized (and which is essential to correct decipherment) that the contents $v$ of 'old red' will always be the same, just before a given block is deciphered, as they were (in this device or in an equivalent one) just before that block was originally enciphered. This can be seen as follows. It is true just after initialization, since $v = K1$ in both cases, and it will be seen, both for full blocks and for short blocks, that if it is true at the beginning of processing one block, then it is true at the end of processing that block, and hence at the beginning of the next block. Thus the statement will be true for all blocks, by mathematical induction.

In box 39, the eight-byte input $y_i$ will be moved into the $\pi$ block I/O register, and also saved 'in reg'. In box 40 decipherment occurs ($\pi_K^{-1}$ or $f_K^{-1}$), and $x_i'$ appears in the $\pi$ block I/O register. On entering box 41, the contents of 'old reg' are, by the inductive hypothesis, the same $v$ as on the entrance to box 23 for the original encipherment of this block. Box 41 performs for this decipherment the same computation $u = g(v)$ as box 23 did for the encipherment of this block. Given $u = g(v)$ in 'old reg' and $x_1'$ in the $\pi$ block I/O reg, box 42 performs for this block of ciphertext the operation $x_i = x_i' \oplus u$, inverse to that performed in box 24 for the corresponding plaintext, and thus recovers the plaintext $x_i$ in 'out reg'. At the same time $y_i$ is copied into 'old reg' to become the $v = y_i$ for the processing of the next block. Since we also had $v = y_i$ for the original encipherment, the inductive property is satisfied. At this point control returns to box 27, and the remainder of the flow for this eight-byte block is the same as for encipherment, except that plaintext is emitted instead of ciphertext.

The branching just described, between boxes 22 and 27, depending upon whether the mode was for encipherment or decipherment, was for full eight-byte blocks. It needs no counterpart for short blocks, boxes 30 through 37, which are used for both encipherment and decipherment, because the exclusive-or'ing in box 36 is its own inverse. If the operation in box 36 were say, addition with carry, with suppression of overflow, then for decipherment the system would need a branch to a box to perform the inverse operation. In any case, the replacement of $v$ in 'old reg' by $f_K(g(v))$ is the same for decipherment as for encipherment, so the inductive hypothesis is satisfied.

This completes the description of the flow for block- or record-chaining, which are the subject of this invention. For the sake of compatibility with existing systems, a no-chaining mode has been included in this embodiment, although the advantages of chaining are such as to recommend its use to the exclusion of no-chaining.

In no-chaining mode, as already noted, the initialization of 'old reg' is with the encipherment $v = f_K(K2)$ of a constant K2, performed in boxes 7, 8 and 9, so that the contents of 'old reg' will be key-dependent. In the no-chaining mode these contents are never altered, and are used for the encipherment of short blocks. In the processing of full eight-byte blocks, at box 21, for no-chaining mode control goes to box 43 where the plaintext or ciphertext block is red into the $\pi$ block I/O register. The encipherment or decipherment mode is tested in box 44 and control goes to box 45 for encipherment, or box 46 for decipherment. From either box, control goes to box 47, where the ciphertext or plaintext is read into 'out reg'. The flow then rejoins the flow for the chaining modes, at box 27. In the case of short blocks, control for no-chaining departs from that for chaining at box 31, boxes 32, 33 and 34 being skipped, control proceeding directly to box 35 et seq., where, as for chaining, the N-byte plaintext or ciphertext input is exclusive-or'ed with 'old reg' to produce the N-byte ciphertext of plaintext output; as with chaining, there is no difference in flow between encipherment and deciperment, provided the operation in box 36 in self-inverse. In this treatment of short blocks, the quantity in 'old reg' which is used for transforming plaintext into ciphertext and vice versa by means of an exclusive-or is a key-dependent constant in the case of no-chaining, as opposed to a history-dependent variable in the case of block- or record-chaining. The no-chaining encipherment of short blocks is therefore cryptographicaly weak, athough it does superficially obscure the plaintext. Hence chaining is recommended.

DETAILED DESCRIPTION OF THE EMBODIMENT

FIG. 3 discloses an exemplary hardware configuration of a cryptographic device capable of performing the previously described cryptographic operations. The four principal processing registers utilized in the system are the Input register 10 ('in reg'), the Old register 12 ('old reg'), the Output register 14 ('out reg'), and the $\pi$ Block I/O Register 50, which is the input/output register of the block-cipher cryptographic subsystem. As stated previously, 'in reg' contains each block of new data as it is received over the input data bus 11. 'Old reg' saves the "chaining-value" $v$, which is either an initializing value or the previous output from the block-cipher subsystem. Thence it may be shifted out, feeding the two exclusive-or circuits 16 and 18 and the two multiplexers MPX2 and MPX4. It should be noted that both exclusive-or circuits perform exactly the same function and are duplicated only because of conflicts of data paths for certain types of operations. Register 20 stores a constant K2 whose encipherment is loaded into 'old reg' 12 for 'no-chaining' mode. Register 22 similarly holds a constant K1 which is appropriately gated into 'old reg' 12 upon initialization of the system when the processing of a new data record, or a new file, is to be begun, when in block-chaining or record-chaining mode, respectively. These constants K1 and K2 may be equal and may be zero.

It should be noted at this time that the present system is a bit-parallel, byte-serial machine wherein each data block is comprised of a maximum of eight bytes. Thus as will be seen in the drawing the data transfer buses are shown to have eight lines to carry the eight bits of each byte. In order for one of the registers 10, 12, 14, etc., to be loaded, eight separate shift signals must be received at the given register in order for eight bytes to be appropriately shifted into that register in bit-parallel, byte-serial fashion. The read-only memory (ROM) 24 is the source of the control signals which control the present system. As is well known in the art of such control memories, each word of such a read-only memory normally contains a first field which may be decoded in an appropriate decoder to produce the desired control pulses on designated lines for controlling the various operations in the system. Secondly, if it is desired to branch to a different sequence in the read-only memory, a branching address may be contained in an appropriate field. If an appropriate test decides that a branch is to be taken, this address will be loaded into the memory address register (MAR) 26, and said different sequence will thereby be available. In the event that there is no branch condition, the memory address register 26 will be appropriately incremented, and the next control word stored in the sequence will be accessed.

The five flag registers F0 through F4 are set automatically from an external input data register which is not shown. These flags will be set to "1" in the following situations. When a Data Clock Pulse is present, flag F0 will be set which merely states that there is data block in an input holding register (not shown) and the data are available on input data bus 11. The appearance of a signal on any of the four lines entitled BOF, BOR, EOR, EOF, standing for beginning of file, beginning of record, end of record, and end of file, respectively, indicates the occurrence of the corresponding condition in the input data format, as shown in FIG. 2. These signals tell the system when certain initializing and terminating functions must be performed, and also indicate that similar signals must be produced appropriately in the output.

The three multiplexers, MPX1, MPX2, and MPX3 perform a straightforward input selection operation for the respective registers into which they are connected. Thus, depending on the binary configuration of the control signals going into a multiplexer, a particular input bus will be selected and connected through into the register itself for loading operations as will be readily understood. Similarly multiplexer MPX4 selects one of the four possible input buses connected thereto and places said input on the output bus 30.

It will be noted that by proper selection of controls, output bus 30 allows data-transfers to take place from MPX4 to the $\pi$ Block I/O REG, or from either of MPX4 or the $\pi$ Block I/O REG to any of MPX2, MPX3, or the exclusive-or 18.

The Input MPX 32 performs a selection function in the same way as the previously described four multiplexes. However, this multiplexer is a single-bit switch and will take place a single bit on its output line 34 rather than eight bits on an output bus as with the others. In effect multiplexer 32 enables tests to be made for various conditions existing in the system. The particular condition to be tested for is specified by the bit configurations appearing on the five bit input cable 36 (four address-bits and one enable-bit), which in effect interrogates a selected one of its 12 input lines 0 through 11. Thus, if for example it is desired to know if the system is in a "block-chain" mode, as at box 13 of FIG. 1B, input line 6 of multiplexer 32 is interrogated, and the "1" or "0" on that line will be gated onto line 34. When the System Clock 38 emits a pulse, then if line 34 indicates a '0' the old address in the memory address register 26 for the read-only memory 24 will be incremented by one, and this new address will be the next one accessed in the ROM. Otherwise, the branch address stored in the current control word of the ROM is gated into the memory address register 26 via part of cable 44, and this address will be utilized to access the next ROM control word as will be well understood. Thus the various inputs to the input multiplexer 32 control all the various branching operations shown in the flowcharts, said branching operations being determined, at any given time, by the input signal line selected at input multiplexer 32, as governed by the bit configuration on cable 36, and by the status of the signal on said selected input line.

The output decoder 40 serves a plurality of control functions which are clearly shown in the figure. The output decoder performs a switching function similar to the input multiplexer 32, however, what is done in this case is that whenever a pulse is produced by the single shot (S/S) 43 under control of the ROM, it is gated out over one of the fifteen output lines of the decoder. The particular line is selected by the four input bits from the ROM fed in at the top of the decoder. It will be noted that the upper group of lines out of the output decoder go to rest (lower) inputs of the flag registers FO through F4. A given reset-line is energized very shortly after its associated flag register has been tested via the input multiplexer and found to be in the set condition. The line marked S/R CLOCK is the shift-register indexing clock, and causes bytes to be successively shifted optionally into and/or out of the three registers 10, 12 and 14, the two constant registers 20 and 22, and the $\pi$ Block I/O Register.

The particular register or registers being shifted during each S/R CLOCK pulse are determined by a six-bit mask, S/R MASK, which comes from latch-circuitry 42, to be described shortly, and which consists of six signals which are latched onto six lines $mE$, $mD$, $mC$ $mB$, $mA$, and $mF$, each of which feeds one input of one of the 'And' gates AO through A5, the other input of each of these 'And' gates being fed by the S/R CLOCK pulse line, and their outputs being the shift-control lines E, D, C, B, A, and F of the six shift-registers 'out reg', 'in reg', 'old reg', 'K1 reg', 'K2 reg', and '$\pi$ Block I/O reg', respectively.

Finally, the five-line cable coming from the bottom of output decoder 40 goes into the circuits 46 and 48, denoted as the Counter and the Copy Register, respectively. The counter is necessary to count the number N of actual data bytes received in a block: eight for a full block, fewer for a short block (terminated by an EOR). The Copy Register is needed to save an extra copy of the value of N when processing short blocks. The functions of the five lines of the cable are as follows: CLEAR clears the Counter to zero; U/D controls the direction (up or down) of counting; CP1 indexes the Counter by 1; LOAD causes the contents of the Copy Register to be copies into the Counter; and CP2 causes the contents of the Counter to be copied into the Copy Register.

The circuit 42, labeled control latches, is also connected to the output of the ROM, by cable 44, and differs from the devices 32 and 40 in that it contains a plurality of setable latches, each connected to one of its designated output lines. The setting of a particular latch is controlled by the output bit pattern from the ROM. The reason that latches are used here is that in general the signals on the output lines from the block 42 must be held for a prolonged period of time, i.e., a number of machine cycles. Thus for a given data transfer operation the particular multiplexer addresses, as well as the particular shift register mask pattern, must be maintained through the entire shifting of the block.

Finally the block at the bottom of the figure designated Block-Cipher Cryptographic Subsystem, specifically having a $\pi$ Block I/O Register 50 in the upper right hand corner thereof, may be any known block-cipher cryptographic system taking in N bits as raw data, and emitting N transformed bits as enciphered or deciphered data. As stated previously a preferred key-controlled block-cipher cryptographic system suitable for use in this block is disclosed in detail in the previously referenced co-pending application Ser. No. 552,685 of W. F. Ehrsam.

The Block-Cipher Cryptographic Subsystem is referred to in the present description and drawings as the "$\pi$ BLOCK". Referring to FIG. 3, it will be noted there is a subscript K and an exponent symbol $\pm 1$. The (K) indicates that it is a key-controlled cryptographic system having key K, and the $\pm 1$ indicate that the same hardware is utilized for both encipherment ($\pi_K^{+1}$) and decipherment ($\pi_K^{-1}$). The four lines entering the top of the $\pi$ Block operate as follows. "$\pm 1$ to $\pi$ Block" sets the subsystem controls to do either encipherment or decipherment. The "Load/Emit $\pi$ Block" line controls the gates of the $\pi$ Block I/O register 50 to tell the register whether it is to function as an input or an output register respectively. The "PROCESS $\pi$ BLOCK" line is, as the name implies, for the purpose of signaling the subsystem to proceed to encipher or decipher the block of data currently sitting in the $\pi$ Block I/O register 50.

Finally, the line marked F is a shift-register control line for gating bytes in or out of π Block I/O register 50. The line marked "PROCESS COMPLETE" coming from the π BLOCK returns to the IMPX and advises the system that the requested cryptographic processing has been completed, and that the enciphered or deciphered block is currently ready in the π Block I/O Register 50.

Figure 3C:
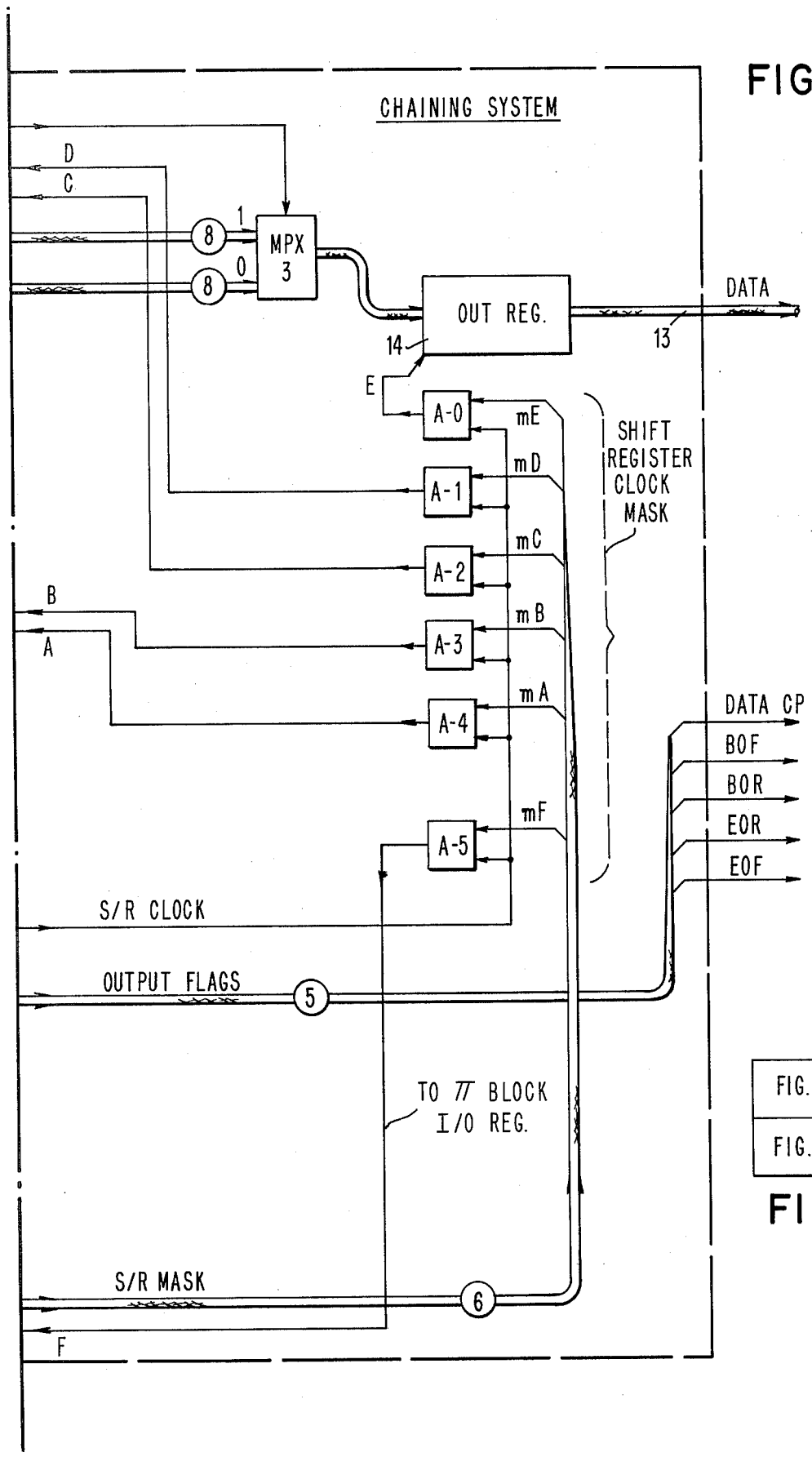

The hardware thus specifically set forth in FIGS. 3A through 3C contains essentially all of the controls necessary to effect the ciphertext chaining operation, as well as the short-block handling operation, which comprise the essential features of the present invention. The earlier description of FIGS. 1A through 1D clearly describe in a general fashion the specific operations which must occur within this hardware. For a specific and detailed understanding of the sequence of the operations which occur, reference will now be made to the following microprogram sequence list.

It should be understood that the choice of the microprogram instruction code, and the implementation of the system therewith, are exemplary only; other equivalent realizations could be used. Also, the amount of parallelism among the microinstructions, and the associated width of the ROM output path 44, have been left unspecified. High speed operation can be obtained by building the microprogrammed controller with a high degree of simultaneity in the control of system hardward resources. This will require a relatively wide data path 44 at a concommitant relatively higher cost. A lower required level of performance can be met by building the system with a relatively lesser degree of simultaneity in the control of system hardward resources. Such a requirement can be met with a relatively narrow data path width 44 at a corresponding relatively lower cost.

As will be appreciated these microprogram sequences are in mnemonic or English language form. In other words, each micro-instruction states the specific hardward functions performed by that statement. In actuality it will of course be understood that each instruction is a binary word, portions of which are susceptible of being decoded by the output decoder and control latches to perform the desired function via the individual control lines in turn emanating from these two blocks. IMPX 32 also receives commands via cable 36 from the ROM as described previously.

The microprogram sequence list closely follows the flowcharts of FIGS. 1A through 1D. The numbers in parentheses to the left of each group of micro-instructions refers to a box having the same number in the flowcharts. Where a group is broken into sections such as (6A) and (6B), this is done because of a branch entry point or a loopback in the system, due to obvious hardward considerations.

To clarify the micro-progrm, several of the microinstructions will now be described in general terms. A process which is needed quite frequently is to transfer a block or blocks of data between the various registers and other hardward systems. This requires setting up appropriate data paths, and also appropriate shift-control paths in order that the shift register clock pulses are applied to the proper shift registers. In order to set up the data paths, the instruction "ADDRESS MPX..." is used. For example, referring to the microprogram sequence list, the first instruction of group (6A), "ADDRESS MPX2 CABLE 3" causes input cable (bus) 3 of MPX2 to be connected to its output bus. This causes the output of 'K1 reg' to be connected to the input of 'old reg'. In order to set up the shift-control paths, an instruction "SET S/R MASK to ——" followed by a six bit binary, field is given. As stated previously this mask is in effect applied to the six 'And' circuits A-0 to A-5. In the present embodiment the six bit binary field is applied as follows. The left-most bit is supplied to the line $mA$ into the 'And' circuit A-4, the second bit is applied to the $mB$ line, the third bit to the $mC$ line, the fourth bit to the $mD$ line, the fifth bit to the $mE$ line, and finally the sixth bit to the $mF$ line. Thus, again referring to the group of instructions designated (6A), the fourth instruction therein is such a masking instruction wherein the mask specified is 011000. This results in the lines $mB$ and $mC$ having an output thereon which will cause S/R CLOCK pulses, when they occur, to be applied via lines B and C to the K1 register 22 and the 'old reg' 12. The effect of this microinstruction and the one just-previously described is to cause each subsequent SR CLOCK pulse to shift one byte out of 'K1 reg' into 'old reg'. Eight such pulses cause the previously described proper initialization of 'old reg' to K1 for chaining.

Two other operations which appear frequently in the microprogram sequence list are the statements "ADDRESS IMPX LINE..." and "TEST IMPX". The latter is always followed by two statements, "IF 1...". and "IF 0...". As stated previously this test governs brancing operations within the system. The input multiplexer, or IMPX, has 12 possible inputs which in essence indicate all of the branching conditions which must be tested, and it has one output, line 34, which is gated from the input line last addressed. Depending upon whether a 1 or a 0 appear on this line, a branch will either be taken or the next sequence is continued, or alternatively one of two branches will be taken. Thus, for example, referring to the microprogram sequence list and looking at the instruction group (5) the first instruction states "ADDRESS IMPX LINE 7", where line 7 is an externally set line to indicate whether there is or is not to be chaining in a particular operation sequence. The IMPX as a consequence gates this particular line to line 34. If a 1 appears thereon then when the second instruction, "TEST IMPX", is executed, the microprogram branches to first instruction in the group (7A), as shown in the third instruction, "IF 1 GO TO (7A). The fourth instruction of this group, "IF 0 CONTINUE", means that if a 0 appears, the microprogram continues to the next instruction, the first instruction in the group designated (6A). Instruction pairs like these are repeated numerous times throughout the microprogram sequence.

The following microprogram sequence list specifies all of the operations necessary to effect the functions performed by boxes 1 through 47 of the flowcharts of FIGS. 1A through 1D. It should perhaps be noted in passing that these boxes are not necessary in sequence since many branch conditions must be provided for. However, as with the flowcharts, all of the instructions necessary to effect the operations specified herein are included in this list of microprogram statements.

| MICROPROGRAM SEQUENCE LIST |
| --- |
| (1) ENTER |
| (2) RESET F0 TO 0 |
| RESET F1 TO 0 |
| RESET F2 to 0 |
| RESET F3 TO 0 |

MICROPROGRAM SEQUENCE LIST

```
            RESET F4 TO 0
   (3)      ADDRESS IMPX LINE 1
            TEST IMPX
               IF 0 GO TO (3)
               IF 1 CONTINUE
            RESET F1
   (4)      OUTPUT BOF SIGNAL
   (5)      ADDRESS IMPX LINE 7
            TEST IMPX
               IF 1 GO TO (7A)
               IF 0 CONTINUE
   (6A)     ADDRESS MPX2 CABLE 3
            CLEAR COUNTER 46
            SET U/D LINE TO 1
            SET S/R MASK TO 011000
            ADDRESS IMPX LINE 9
   (6B)     EMIT S/R CLOCK PULSE
            INCREMENT COUNTER 46
            TEST IMPX
               IF 0 GO TO (6B)
               IF 1 GO TO (10)
   (7A)     ADDRESS MPX4 CABLE 0
            ENABLE MPX4
            SET S/R MASK TO 100001
            SET LOAD/EMIT π BLOCK LINE TO 1
            CLEAR COUNTER 46
            SET U/D LINE TO 1
            ADDRESS IMPX LINE 9
   (7B)     EMIT S/R CLOCK PULSE
            INCREMENT COUNTER 46
            TEST IMPX
               IF 0 GO TO (7B)
               IF 1 CONTINUE
            DISABLE MPX4
   (8)      SET ±1 TO π BLOCK LINE TO 1
            SET PROCESS π BLOCK LINE TO 1.
   (9A)     SET S/R MASK TO 001001
            ADDRESS MPX2 CABLE 2
            ADDRESS IMPX LINE 10
   (9B)     TEST IMPX
               IF 0 GO TO (9B)
               IF 1 CONTINUE
            SET LOAD/EMIT π BLOCK LINE TO 0
            SET PROCESS π BLOCK LINE TO 0
            GO TO (6B)
   (10)     ADDRESS IMPX LINE 4
            TEST IMPX
               IF 1 RESET F4
                  GO TO (38)
               IF 0 CONTINUE
   (11)     ADDRESS IMPX LINE 2
            TEST IMPX
               IF 0 GO TO (10)
               IF 1 CONTINUE
            RESET F2
   (12)     OUTPUT BOR SIGNAL
   (13)     ADDRESS IMPX LINE 6
            TEST IMPX
               IF 0 GO TO (15)
               IF 1 CONTINUE
   (14A)    ADDRESS MPX2 CABLE 3
            SET U/D LINE TO 1
            SET S/R MASK TO 011000
            ADDRESS IMPX LINE 9
   (14B)    EMIT S/R CLOCK PULSE
            INCREMENT COUNTER 46
            TEST IMPX
               IF 0 GO TO (14B)
               IF 1 CONTINUE
   (15)     CLEAR COUNTER 46
   (16)     ADDRESS IMPX LINE 3
            TEST IMPX
               IF 1 GO TO (28)
               IF 0 CONTINUE
   (17)     ADDRESS IMPX LINE 0
            TEST IMPX
               IF 0 GO TO (16)
               IF 1 CONTINUE
            RESET F0 TO 0
   (18)     ADDRESS IMPX LINE 9
            ADDRESS MPX1 CABLE 0
            SET S/R MASK TO 000100
            EMIT S/R CLOCK PULSE
   (19)     INCREMENT COUNTER 46
   (20)     TEST IMPX
               IF 0 GO TO (16)
               IF 1 CONTINUE
   (21)     ADDRESS IMPX LINE 7
            TEST IMPX
               IF 1 GO TO (43A)
               IF 0 CONTINUE
   (22)     ADDRESS IMPX LINE 8
            TEST IMPX
               IF 0 GO TO (39A)
               IF 1 CONTINUE
   (23)     ADDRESS MPX4 CABLE 1
            ENABLE MPX4
            ADDRESS MPX2 CABLE 2
            SET S/R MASK TO 001000
            EMIT S/R CLOCK PULSE
            EMIT S/R CLOCK PULSE
            EMIT S/R CLOCK PULSE
            EMIT S/R CLOCK PULSE
   (24A)    SET U/D LINE TO 1
            ADDRESS MPX4 CABLE 2
            SET S/R MASK TO 001101
            SET LOAD/EMIT π BLOCK LINE TO 1
            ADDRESS IMPX LINE 9
   (24B)    EMIT S/R CLOCK PULSE
            INCREMENT COUNTER 46
            TEST IMPX
               IF 0 GO TO (24B)
               IF 1 CONTINUE
   (25A)    SET ±1 TO π BLOCK LINE TO 1
            SET PROCESS π BLOCK LINE TO 1
            ADDRESS IMPX LINE 10
   (25B)    TEST IMPX
               IF 0 GO TO (25B)
               IF 1 CONTINUE
   (26A)    DISABLE MPX4
            ADDRESS MPX3 CABLE 0
            ADDRESS MPX2 CABLE 2
            SET S/R MASK TO 001011
            SET U/D LINE TO 1
            ADDRESS IMPX LINE 9
   (26B)    EMIT S/R CLOCK PULSE
            INCREMENT COUNTER 46
            TEST IMPX
               IF 0 GO TO (26B)
               IF 1 CONTINUE
   (27A)    SET U/D LINE TO 1
            SET S/R MASK TO 000010
            ADDRESS IMPX LINE 9
   (27B)    EMIT OUTPUT DATA CP PULSE
            EIT S/R CLOCK PULSE
            INCREMENT COUNTER 46
            TEST IMPX
               IF 0 GO TO (27B)
               IF 1 GO TO (15)
   (28)     RESET F3 TO 0
            ADDRESS IMPX LINE 11
            TEST IMPX
               IF 0 GO TO (30)
               IF 1 CONTINUE
   (29)     OUTPUT EOR PULSE
            GO TO (10)
   (30)     LOAD COPYREG 48
   (31)     ADDRESS IMPX LINE 7
            TEST IMPX
               IF 1 GO TO (35A)
               IF 0 CONTINUE
   (32A)    ENABLE MPX4
            ADDRESS MPX4 CABLE 1
            ADDRESS MPX2 CABLE 2
            SET S/R MASK TO 001000
            EMIT S/R CLOCK PULSE
            EMIT S/R CLOCK PULSE
            EMIT S/R CLOCK PULSE
            EMIT S/R CLOCK PULSE
            SET S/R MASK TO 001001
            SET LOAD/EMIT π BLOCK LINE TO 1
            SET U/D LINE TO 1
            ADDRESS IMPX LINE 9
   (32B)    EIT S/R CLOCK PULSE
            INCREMENT COUNTER 46
            TEST IMPX
               IF 0 GO TO (32B)
               IF 1 CONTINUE
            DISABLE MPX4
   (33A)    SET ± 1 TO π BLOCK LINE TO 1
            ADDRESS IMPX LINE 10
            SET PROCESS π BLOCK LINE TO 1
   (33B)    TEST IMPX
               IF 0 GO TO (33B)
               IF 1 CONTINUE
            SET PROCESS π BLOCK LINE TO 0
   (34A)    ADDRESS MPX2 CABLE 2
            SET S/R MASK TO 001001
            SET U/D LINE TO 1
            CLEAR COUNTER 46
            SET LOAD/EMIT π BLOCK LINE TO 0
            ADDRESS IMPX LINE 9
   (34B)    EMIT S/R CLOCK PULSE
            INCREMENT COUNTER 46
```

MICROPROGRAM SEQUENCE LIST

```
            TEST IMPX
               IF 0 GO TO (34B)
               IF 1 CONTINUE
   (35A)    ADDRESS IMPX LINE 9
            LOAD COUNTER 46
            SET S/R MASK TO 000100
            SET U/D LINE TO 1
   (35B)    EMIT S/R CLOCK PULSE
            INCREMENT COUNTER 46
            TEST IMPX
               IF 0 GO TO (35B)
               IF 1 CONTINUE
   (36A)    ENABLE MPX4
            ADDRESS MPX4 CABLE 2
   (36A)    (Continued)
            ADDRESS MPX2 CABLE 1
            ADDRESS MPX3 CABLE 0
            SET S/R MASK TO 001110
   (36B)    EIT S/R CLOCK PULSE
            INCREMENT COUNTER 46
            TEST IMPX
               IF 0 GO TO (36B)
               IF 1 CONTINUE
   (37A)    LOAD COUNTER 46
            SET U/D LINE TO 0
            SET S/R MASK TO 000010
            IMPX TO 11
   (37B)    OUTPUT DATA OF PULSE
            EMIT S/R CLOCK PULSE
            DECREMENT COUNTER 46
            TEST IMPX
               IF 0 GO TO (37B)
               If 1 GO TO (29)
   (38)     OUTPUT EOF PULSE
            GO TO (2)
   (39A)    ENABLE MPX4
            ADDRESS MPX4 CABLE 3
            ADDRESS MPX1 CABLE 1
            SET LOAD/EMIT π BLOCK LINE TO 1
            SET U/D LINE TO 1
            SET S/R MASK TO 000101
            ADDRESS IMPX LINE 9
   (39B)    EMIT S/R CLOCK PULSE
            INCREMENT COUNTER 46
            TEST IMPX
               IF 0 GO TO (39B)
               IF 1 CONTINUE
   (40A)    SET ± 1 TO π BLOCK LINE TO 1
            SET PROCESS π BLOCK LINE TO 1
   (40B)    ADDRESS IMPX LINE 10
            TEST IMPX
               IF 0 GO TO (40B)
               IF 1 CONTINUE
            SET PROCESS π BLOCK LINE TO 0
   (41)     ADDRESS MPX4 CABLE 1
            ADDRESS MPX2 CABLE 2
            SET S/R MASK TO 001000
            EMIT S/R CLOCK PULSE
            EMIT S/R CLOCK PULSE
            EMIT S/R CLOCK PULSE
            EMIT S/R CLOCK PULSE
   (42A)    DISABLE MPX4
            SET U/D LINE TO 1
            ADDRESS MPX3 CABLE 1
            ADDRESS MPX2 CABLE 0
            SET S/R MASK TO 001111
            ADDRESS IMPX LINE 9
   (42B)    EMIT S/R CLOCK PULSE
            INCREMENT COUNTER 46
            TEST IMPX
               IF 0 GO TO (42B)
               IF 1 GO TO (27A)
   (43A)    ADDRESS MPX4 CABLE 3
            ENABLE MPX4
            SET LOAD/EMIT π BLOCK LINE TO 1
            SET S/R MASK TO 000101
            SET U/D LINE TO 1
            ADDRESS IMPX LINE 9
   (43B)    EMIT S/R CLOCK PULSE
            INCREMENT COUNTER 46
            TEST IMPX
               IF 0 GO TO (43B)
               IF 1 CONTINUE
   (44)     ADDRESS IMPX LINE 8
            TEST IMPX
               ·IF 0 GO TO (46)
               IF 1 CONTINUE
   (45A)    SET ± 1 TO π BLOCK LINE TO 1
   (45B)    SET PROCESS π BLOCK LINE TO 1
            ADDRESS IMPX LINE 10
   (45C)    TEST IMPX
               IF 0 GO TO (45C)
```

MICROPROGRAM SEQUENCE LIST

```
               IF 1 CONTINUE
            SET PROCESS π BLOCK LINE TO 0
            GO TO (47A)
   (46)     SET ± 1 TO π BLOCK LINE TO 0
            GO TO (45B)
   (47A)    SET LOAD/EMIT π BLOCK LINE TO 0
            DISABLE MPX4
            ADDRESS MPX3 CABLE 0
            SET U/D LINE TO 1
            SET S/R MASK TO 000011
            ADDRESS IMPX LINE 9
   (47B)    EMIT S/R CLOCK PULSE
            INCREMENT COUNTER 46
            TEST IMPX
               IF 0 GO TO (47B)
               IF 1 GO TO (27A)
```

It is believed that the previous general description of the hardward embodiment FIGS. 3A through 3C together with the above microprogram sequence list clearly indicates the operation of the present system in sufficient detail to permit anyone skilled in the art to construct such a system.

The following description hence will be a restatement of parts of the microprogram in text form, tied in to FIGS. 3A through 3C where appropriate. In view of the exhaustive description of the method with respect to the flowchart of FIGS. 1A through 1D, the following description will principally state what is done at each microprogram operation and only at times will relate these to the larger actions shown in the flowchart, since the correspondence between the flowchart and this description from this description to the flowchart is extremely straight forward in view of the numbering of the microprogram sequences to correspond almost to the blocks in said flowchart, any slight differences being due to considerations of convenience or economy.

Beginning first with the actual entry into the system, blocks 1 through 11 will be briefly described. Step (1) is merely the entry point into the system, equivalent to turning on the 'on switch'.

In step (2), all five of the flags F0 through F4 are reset to 0. The system continues to step (3), wherein the first instruction causes the IMPX line one to be addressed which interrogates the status of F1. If the line is 0 the system is essentially in a wait loop and goes back to the first instruction of step (3) and continues testing line 1 of IMPX until the value of 1 is encountered, which indicates a beginning of file. When this happens the system continues operating and causes a reset pulse to be applied to F1 to reset same to 0. The system then continues to step (4) wherein a BOF signal is produced in the output from the system. The system continues to step (5) wherein first instruction of which addresses line 7 of the IMPX. Next instruction tests this line and if it is set to a 1, indicating no-chaining, the system branches to step (7A). If not, it continues to the step (6A). The first instruction of step (6A) causes MPX2 to set up a flow path to its output from cable 3 of its input. The next instruction clears the counter 46 to all 0's. The next instruction causes the U/D line to counter 46 to be set to a 1, which will cause the counter to be incremented whenever it receives a clock pulse over line CP1. The next instruction causes the S/R MASK to be set to 011000, i.e. $A=D=E=F=0$, and $B=C=1$, which causes the shift-register clock mask and circuits A-0 through A-5 to be appropriately set whereby only the K1 register 22 (via line B) and the old register 12 (via line C) will receive appropriate shifting pulses. The next instruction causes line 9 of the IMPX to be addressed for monitoring purposes.

Step (6B) actually performs the loading operation, and its first instruction causes a S/R CLOCK pulse to be emitted, which is supplied only to the two shift registers as explained previously. Next the counter 46 is incremented and subsequent to this the IMPX is tested. As will be noted, the last instruction of step (6A) caused line 9 of the IMPX to be addressed. Referring to FIG. 3B, line 9 is the "counter carry" from the counter 46, and it is used to indicate when 8 shifts have been performed, which in turn means that the old register is completely loaded with the contents of the K1 register. Thus, if the line 9 into the IMPX is still at 0, which means that fewer than eight shifts have occurred, the system returns to step (6B) and goes through another shifting cycle. This looping continues until the line is set to a 1, which indicates that the shifting and loading is complete, and the system proceeds to step (10). It should be noted in passing that there are also a number of other ways for getting to step (10) which are quite evident from the flowchart and will not again be repeated here. In step (10) the first instruction addresses the IMPX on line 4. The next instruction interrogates this line. If it is set to a 1, indicating an end of file, F4 is reset to 0 and the sequence goes to step (38). If the interrogated line is set to a 0, the system continues to step (11). In step (11), line 2 of the IMPX is tested, which tests for a beginning of record as will be appreciated from both the flowchart and hardware diagrams. If this line is set to a 0 the system returns to step (10) and conversely if it is set to a 1 the system resets F2 and continues to block 12. This essentially completes the initializing operation from steps (1) through (11).

There will now be described a sequence wherein a full block of data is enciphered. There is shown in blocks 21 through 27. For the purposes of this description, it is assumed that ciphertext chaining is being utilized and that the operation is encipherment which will cause this system to proceed directly from step (21) to (22), then to step (23), and so forth through steps (27).

Referring to step (21) the IMPX line 7 is addressed. The contents of this line are then tested in the next instruction and if 1 (no-chaining) the system will branch to step (43A), otherwise it continues to step (22), which is the case being assumed here. The first instruction of step (22) causes line 8 of the IMPX to be addressed. The next step tests the contents of that line and if 0 (decipher) the system would branch to step (39A), if a 1 (encipher) it continues to step (23). The first instruction of step (23) addresses cable 1 of MPX4. The next one connects MPX4 to the output cable. The next instruction causes MPX2 to aaddress cable 2 of its input, or stated differently, connects cable 2 to its output. The next instruction sets the S/R MASK to 001000. The next four instructions cause four clock pulses to be applied over line C to 'old reg', which in effect rotates the contents of 'old reg' by four bytes for four positions, as was described previously with reference to the "twiddle" operation. The system then proceeds to step (24A) where the first instruction sets U/D LINE to 1. The next instruction connects cable 2 in the input to MPX4 to its output cable. The next instruction sets the S/R MASK to 001101 (connecting the S/R CLOCK line to C,D,F). The next instruction causes the load/Emit π Block line to be set to a 1 causes the π Block I/O register 50 to accept data upon receipt of the proper clock pulse. The next instruction addresses line 9 (the counter carry) of the IMPX. The system then proceeds to step (24B) where the first instruction causes the S/R CLOCK PULSe to be emitted. Because of the settings of MPX2, MPX4 and S/R MASK, this causes the exclusive-or of a byte of 'in reg' and a byte of 'old reg' to enter the π Block I/O Register and all three registers to be shifted. Counter 46 is incremented by 1 and the IMPX is tested. If the test is 0 the system returns to the first instruction of the step (24B) and if 1 continues to step (25A). At this point the π Block I/O Register contains the exclusive-or of 'in reg' and 'old reg'. The first instruction of step (25A) sets the 90 block ±1 line to 1 which indicates that an encipherment operation is to take place therein. The next instruction causes a "process π block" signal to be emitted, which causes a block ciphering sequence to occur in the π block cryptographic subsystem. The next instruction causes line 10 of the IMPX to be interrogated which in effect checks to see if the encipherment process has been completed. If not the system stays in the wait loop (25B) until line 10 changes to a 1, at which point it continues to step (26A). The first instruction of step (26A) disconnects MPX4 from its output cable. The next instruction connects input cable 0 to MPX3 of its output cable. The next instruction connects cable 2 of MPX2 to its output cable. The next instruction sets S/R MASK to 001011 and the following instruction sets the U/D LINE to 1, and the final instruction of step (26A) addresses line 9 of the IMPX. Sequence (26B) yields the eight byte-shifting operations which must occur sequentially to perform the data register loading as set forth in block 26 of the flowcharts. The first instruction of step (26B) emits a S/R CLOCK pulse and the counter 46 is incremented. The IMPX is tested and if 0, (26B) is repeated, but if 1, it means that eight shifts have occurred and the system can continue to step (27A). The result has been to read the π Block I/O register into both 'old reg' and 'out reg'.

The first instruction of step (27A) causes the U/D line to be set to 1. The next instruction sets the S/R MASK to 000010. The next instruction causes line 9 of the IMPX to be addressed. The system then proceeds to step (27B) where the first instruction causes an output DATA Clock Pulse to be emitted from the system over an output flag line from the output decoder 40. The next instruction causes a S/R CLOCK pulse to be produced, which is applied via the shift-register mask to be 'out reg' 14, and causes the next byte of data therein to be present at the output of this register on DATA line 13. The next step increments counter 46 by 1 and the IMPX is tested. Again this test on line 9 of the IMPX is for the purpose of determing when eight bytes have been shifted out of the 'out reg'. Until then, this line is set at 0 and the system returns to step (27B). This continues until the line goes to a 1. At this point the system proceeds to step (15).

The above description of the steps (21) through (27), taken together with the description of steps (1) through (11), clearly describe the operation of the system under control of the microprogram sequences. The operation of all of the other sequences is performed in substantially the same way and the specific operating sequences may be readily determined by following through each enumerated operation in the microprogram sequence chart.

CONCULSION

It will be apparent from the above detailed description of the operation of the present cryptographic system, that the disclosed hardware implements the concepts of ciphertext chaining in a hardware configuration whereby the same hardware may be utilized for both encipherment and decipherment with a minimum amount of control changes and virtually no hardware reconfiguration. While the disclosed embodiment is set forth as a bit-parallel byte-serial machine, it will readily be apparent that the machine could be configured to accomodate other data formats, e.g., bit-serial or full block-parallel, by a person skilled in the art. Further, as stated previously in the specification, in addition to the exclusive-or transformation or combination of the previous ciphertext with a block of new data, other transformations, such as a simple add or the controlled circular shift could also be utilized. Further, other data blocks than the immediately preceding ciphertext could be utilized in the chaining process. Also, plaintext chaining or key chaining could be utilized in addition to ciphertext chaining subject chaining subject of course to the constraint of the mathematical inertibility, i.e., that the original data may be readily retrieved by the inverse operations.

Thus, while the invention has been disclosed and described with respect both to a specific preferred hardware embodiment and also a specific operational sequence, it is to be understood that many changes and variations could be made by a person skilled in the art without departing from the spirit and scope of the invention.

What is claimed is:

1. In a cryptographic system which includes a key-controlled block-cipher cryptographic process which comprises taking an input data block of fixed size, called a full-block and cryptographically transforming same into an output data block of the same fixed size as a function of a unique user supplied key, the improvement which comprises combining each new block of input data and initially transforming same by a mathematically invertible function which depends on a data word which existed during a previous key-controlled block-cipher cryptographic transformation and using said transformed data block as the input block to said key-controlled block-cipher cryptographic transformation.

2. A cryptographic method as set forth in claim 1 including using the output data block of a previous key-controlled block-cipher cryptographic transformation as said previously existing data word.

3. A cryptographic method as set forth in claim 2 including selecting the output data block of the immediately preceding key-controlled block-cipher cryptographic transformation as said previously existing data word.

4. A cryptographic method as set forth in claim 3 including using a predetermined constant in place of said previously existing data word during an encryption sequence when there is no available data word.

5. A cryptographic method as set forth in claim 4 wherein the invertible mathematical transformation utilized in combining a new input data block with a previously existing data word is a bitwise exclusive-or operation.

6. A cryptographic method as set forth in claim 3 including detecting that a data block that is shorter than the fixed full-block size required by the block-cipher cryptographic process, is to be transformed by the cryptographic system comprising;

determining the length of the short-block, transforming a previously existing data word by the block-cipher cryptographic process, to produce a full output data block, then transforming said input short block into an output short block of the same size by a mathematically invertible function of said input short block, said function depending on said full output data word.

7. A cryptographic method as set forth in claim 6, including utilizing the cryptographically transformed output data block of the previous cryptographic transformation as the previously existing data word for said further block-cipher cryptographic process for producing said short output data block and further including the step of retaining said further cryptographically transformed data word for use in the combining operation for the next input data block if one is present.

8. In a key-controlled block-cipher cryptographic system including input data chaining means for cryptographically transforming an input data block $x_i'$ into an output data block $y_i$ under control of a unique user supplied key K whereby the output data block is cryptographically transformed in accordance with the relationship:

$$y_i = f_K(x_i')$$

and wherein $x_i'$ may be retrieved in accordance with the relationship:

$$x_i' = f_K^{-1}(y_i)$$

the improvement which comprises means for chaining successive blocks ($x_i$) of input data and performing an initial transformation thereon prior to said block-cipher cryptographic transformation defined by the relationship:

$$x_i' = x_i \boxplus u_i$$

where $u_i$ comprises a data word which was utilized in the block-cipher cryptographic system during a preceding transformation and wherein $\boxplus$ comprises a logical element which performs a dyadic operation having a right inverse.

9. A key-controlled cryptographic system as set forth in claim 8 including exclusive-or circuit means for performing said $\boxplus$ function and means for introducing a cryptographically transformed output block $u_i$ from a prior block-cipher cryptographic transformation to said exclusive-or means as one input thereto, means for supplying a current input block $x_i$ as the other output.

10. In a block-cipher cryptographic system including a key-controlled block-cipher cryptographic subsystem having means for cryptographically transforming an input of data block of a fixed predetermined length into a output block of the same length as a function of a unique user supplied key, the improvement which comprises an initial transformation system including means for combining each new block of input data in an initial transformation as a mathematically invertible function, said transformation depending on an output data block from a previous cryptographic transformation and means for supplying said data word to said combining means as each new input block is received, said combining means including logic means for performing said mathematically invertible function on said input data block which function depends on said supplied data word, and means for supplying said initially transformed input data block to the key-controlled cryptographic subsystem as the input data block thereto.

11. A key-controlled cryptographic system as set forth in claim 10 wherein said supplying means includes means for transferring the output data block of the immediately preceding cryptographic transformation to said combining means.

12. A key-controlled cryptographic system as set forth in claim 10 including means for detecting that an input block of a length shorter than said fixed predetermined length is to be transformed by the cryptographic system including means for determining the length of the short block, means for supplying a predetermined data word to said block-cipher cryptographic subsystem and causing a key-controlled cryptographic transformation to occur thereon, means for taking the cryptographically transformed output of said subsystem and selecting a portion thereof equal in length to the length of said short block, and supplying said two equal length blocks as the input to said combining means and means for gating the output of said combining means as the output of said cryptographic system for said short input block which is the same length as said short input block.

13. A key-controlled cryptographic system as set forth in claim 12 including means for selectively utilizing the cryptographically transformed output data block of the preceding key-controlled cryptographic transformation or a predetermined constant as the predetermined data word to be supplied to said cryptographic subsystem prior to combining with an input short data block and means for retaining said cryptographically transformed data word for use in a subsequent initial transformation.

14. In a block-cipher cryptographic system including a key-controlled block-cipher cryptograhic subsystem, having means for performing a cryptographic transformation on an input data block of a fixed predetermined size, said transformation being a function of a unique user supplied key, the improvement which comprises:

an initial transformation subsystem including first register means for receiving an input block of data to be transformed;

second register means for receiving a unique data block which existed at a prior time in the key-controlled block-cipher cryptographic subsystem;

means for gating the output of said cryptographic subsystem onto a system output bus and selectively into said second register;

logic means for effecting a mathematically invertible initial transformation on the contents of said first register means which is a function of the contents of said second register means;

means for gating the output of said logic means into said cryptographic subsystem means as a input data block to be cryptographically transformed thereby; and means for selectively loading said second register means when a data word from a previous cryptographic transformation is not available.

15. A block-cipher cryptographic system as set forth in claim 14 including first means for determining that a block of data shorter than said fixed predetermined length has been received at the system input;

second means for determining the length of said short block, means responsive to said first determining means for gating the current contents of said second register means directly to said cryptographic subsystem means where a cryptographicc transformation is performed thereon;

means for reloading the second register means with the output of said cryptographic transformation;

means under control of said second determining means for gating the short block contents of said first register and as many bits of the cryptographically transformed contents of said second register as there are bits in said short block to said logic means; and means for transferring the output of said logic means directly to said system output bus as the short block output of said block-cipher cryptographic system.

16. A block-cipher cryptographic system as set forth in claim 14 wherein said logic means comprises an exclusive-or circuit having as one input the N-bit contents of said first register means, and which has as a second input the N-bit contents of said second register means to produce an N-bit output word.

* * * * *